United States Patent [19]

Hsu

[11] Patent Number: 5,406,456
[45] Date of Patent: Apr. 11, 1995

[54] MODULAR ELECTRONIC PACKAGING FOR INTERNAL AND EXTERNAL MODULES

[76] Inventor: Winston Hsu, 14508 Pebblewood Dr., Gaithersburg, Md. 20878

[21] Appl. No.: 137,749
[22] Filed: Oct. 19, 1993
[51] Int. Cl.⁶ .............................................. H05K 5/00
[52] U.S. Cl. ................................. 361/752; 361/748; 361/796; 364/708.1
[58] Field of Search .............. 361/724, 728, 736, 748, 361/752, 756, 759, 784, 796, 802; 364/708, 900; 174/260; 340/700

[56] References Cited

U.S. PATENT DOCUMENTS 5,132,876  7/1992  Ma ........................................ 361/394

Primary Examiner—Leo P. Picard
Assistant Examiner—Young Whang

[57] ABSTRACT

A modularized electronic system such as notebook or palmtop for packaging and assembling a plurality of internal and external modules comprises at least one upper case assembly and one lower case assembly for clamping the internal modules in between. Each internal module comprises a module head, a module body and a near port. The module head further comprises a connector on its bottom and is vertically plugged in a receptacle on a PCB board assembly attached to the lower case assembly. The lower case assembly further comprises a U-shaped opening on top of a side panel behind the module assembly for the attachment of the rear port. The upper case assembly further comprises a module clamping device under its top panel which is removably attached to the upper end of the module assembly when the external enclosure case is closed whereby the module assembly and the PCB board assembly are horizontally clamped between the upper and lower case assemblies. The new mounting mechanism allows complete internal and external modularization for portable computers.

31 Claims, 17 Drawing Sheets

MODULAR ELECTRONIC PACKAGING FOR INTERNAL AND EXTERNAL MODULES

BACKGROUND OF THE INVENTION

This invention relates to both the electronic module design and the related mounting mechanism of an electronic system, and more particularly, to an electronic system comprising a plurality of internal and external electronic modules and an external enclosure case for mounting all these modules.

The electronic packaging designs for many notebook or subnotebook computers have been dramatically improved by many computer vendors to increase their modularity and manufactureability. Many electronic modules such as hard drive, battery, modem, mouse, keyboard, etc, are externally attached to the portable computers and can be installed or replaced by users directly. But such external module solutions can only be used to partially modularize a portable computer externally. Many internal components such as motherboard, daughterboard, etc, and the internal mounting mechanisms are also greatly simplified by those portable computer vendors for easy assembly and handling. But unfortunately most of those internal components and mounting mechanisms designs can only be used in a product-by-product base and can not be used as a uniform internal module and mounting mechanism design.

Lack of a proper internal module design not only prevents the complete internal modularization, but also makes the external modularization difficult. Most of the existing external modules are too closely tied to their internal hardware and case ID design. Their dispositions are mostly fixed because all their internal hardware and mounting mechanisms are also fixed. If a new ! internal module and mounting mechanism design can be provided to completely modularize all the internal components, the external modules and their mounting mechanisms can also be created according to the new internal module and mounting mechanism. Besides, if proper I/O port options can also be provided in the new internal module design, many existing external modules can be designed as new internal modules and thus can get better protection from the external enclosure case.

Modularity and reliability become more and more important when the portable computers are more frequently used in many fields. It is important to provide the computer users a flexible and reliable solution so that they can configure the computers according to their needs, and assemble or even maintain such computers by themselves. Such goal can not be achieved if a portable computer can not be completely modularized internally and externally. Apparently, the modular designs used in existing portable computers can not achieve this goal. New internal and external modules and the related mounting mechanisms must be devised to achieve it.

SUMMARY OF THE PRESENT INVENTION

It is therefore the goal of the present invention, by overcoming the limits of the prior art, to devise several new internal and external modules and the related mounting mechanisms to achieve the following objects:
1. Allows the complete internal and external modularization of the portable computers.
2. Provides several simple and reliable mounting mechanisms to provide shock protection to all the internal and external modules.
3. All the internal and external modules can be easily assembled or disassembled by end users.

Briefly, in a preferred embodiment, the present invention includes a modularized electronic system for packaging and assembling a plurality of electronic modules comprising:
1. at least one external enclosure case having at least two case assemblies each having at least one case assembly attachment means wherein the case assembly attachment means of one of the case assemblies engages and securely attaches to the case assembly attachment means of another of the case assemblies in a removable manner; one of the case assemblies comprising the top panel of the external enclosure case is called the upper case assembly and another of the case assemblies comprising the bottom panel of the external enclosure case is called the lower case assembly; the upper case assembly is removably and securely attached to the lower case assembly by the case assembly attachment means of both upper and lower case assemblies when the external enclosure ease is closed;
2. at least one PCB board assembly having at least one receptacle installed on it; the PCB board assembly further comprises a PCB board attachment means and the lower case assembly further comprises a PCB board attachment receiving means wherein the PCB board attachment means of the PCB board assembly engages and securely attaches to the PCB board attachment receiving means of the lower case assembly in a removable manner;
3. at least one electronic module assembly vertically mounted to the lower case assembly; the module assembly comprises:
   a. a substantially rectangular module head in its front end having a rigid module head connector installed under it facing downward direction for transmitting signals or power; the module head connector is vertically connected to the receptacle of the PCB board assembly in a removable manner;
   b. a substantially rectangular module body which is rigidly and horizontally connected to the module head; and
   c. at least one substantially rectangular rear port rigidly and horizontally connected to the rear end of the module body;
4. at least one vertical panel on the lower case assembly with a U-shaped opening on its upper edge; the rear port of the module assembly is vertically attached to the U-shaped opening of the vertical panel in a removable manner whereby the module assembly can be vertically installed to or removed from the U-shaped opening of the lower case assembly by hand; the vertical panel of the lower case assembly further comprises a case assembly attachment means on the top ends of the left and right sides of the H-shaped opening and the upper case assembly further comprises a correspondent case assembly attachment means wherein the case assembly attachment means of the upper case assembly engages and securely attaches to the case assembly attachment means of the vertical panel of the lower case assembly whereby the rear port of the module assembly is locked and secured between the upper case assembly and the U-shaped opening of the lower case assembly;

5. at least one module clamping means installed under the top panel of the upper case assembly; the module clamping means of the upper case assembly engages and removably attaches to the upper end of the module body or module head when the external enclosure case is closed whereby the module assembly and the PCB board assembly are horizontally clamped between the upper and lower case assemblies.

Several optional I/O ports such as the upper port, the lower port and the side port can also be installed on the module assembly to provide more I/O options. Besides, external modules can also be installed above the module assembly with an upper I/O port.

It is an advantage of the present invention that it can be used as a general purpose mounting mechanism which allows complete internal and external modularization of a portable computer. It is another advantage that all these internal and external modules can be easily assembled or disassembled by the end users without using special tools.

These and other objects and the advantages of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 20 is the side section view A—A of

DETAILED DESCRIPTION OF THE PREFERRED EMBODIMENT

Low profile internal modules and their module clamping design are very important to the notebook or palmtop computers because it greatly simplifies the internal mounting mechanism design of those portable computers and also brings in a low cost and versatile modular solution. FIGS. 1, 2, 3, 4 and 5 series present a basic low profile internal module assembly and its mounting design.

Figure 1A:
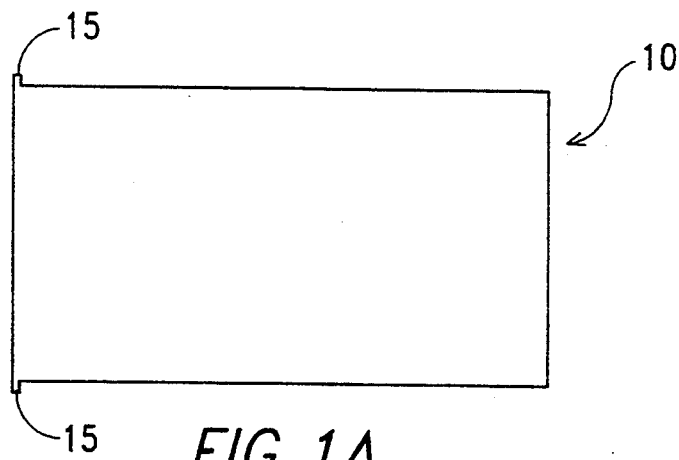
FIG. 1A is the top view of a module assembly according to the present invention.
Figure 1B:
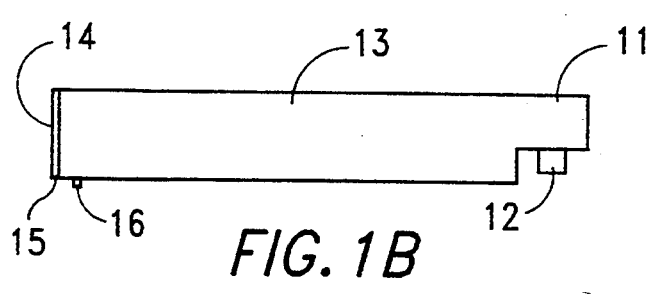
FIG. 1B is the side view of a module assembly according to the present invention.
Figure 1C:
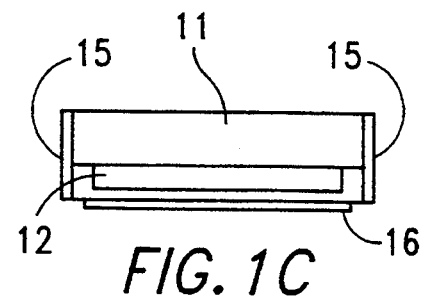
FIG. 1C is the front view of a module assembly according to the present invention.

FIGS. 1A, 1B, and 1C are the top, side and front views of a module assembly 10 according to the present invention. It comprises:(1) a substantially rectangular module head 11 in its front end having a rigid module head connector 12 installed under it facing downward direction for transmitting signals or power; (2) a substantially rectangular module body 13 which is rigidly and horizontally connected to the module head 11; (3) at least one substantially rectangular rear port 14 rigidly and horizontally connected to the rear end of the module body 13. The module assembly 10 further comprises two vertical protruding edges 15 on the left and right sides of the rear port 14 and a bottom protruding edge 16 on the bottom end of the rear port 14 for module mounting purpose. The module head connector 12 is disposed higher than the bottom of the module body 13 whereby the module head connector 12 will not touch the bottom surface when placed externally and thus makes it easier to keep the module head connector clean and to avoid damage.

Figure 2A:
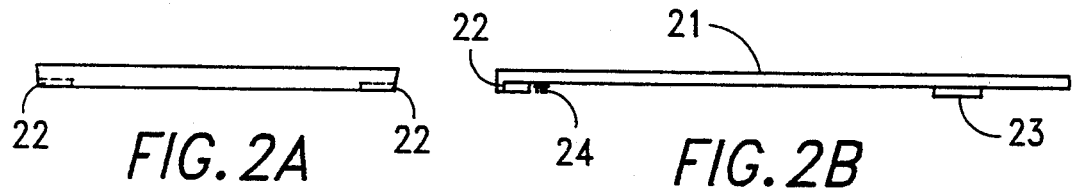
FIG. 2A is the rear view of part Of an upper case assembly according to the present invention.
Figure 2B:
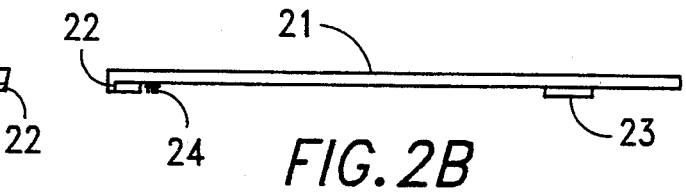
FIG. 2B is the side view of part of an upper case assembly according to the present invention.
Figure 2C:
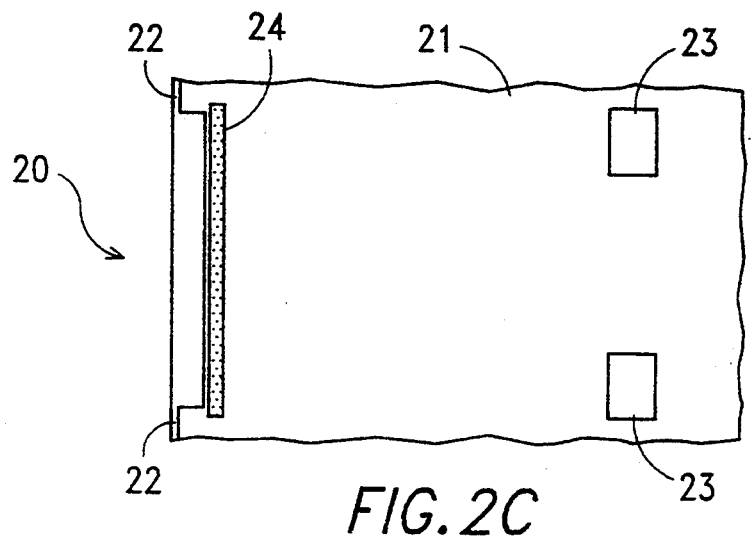
FIG. 2C is the bottom view of part of an upper case assembly according to the present invention.

FIGS. 2A, 2B; and 2C are the rear, side and bottom views of part of an upper case assembly 20 according to the present invention. The upper case assembly 20 comprises a top panel 21, a case attachment means 22 which will attach to the top of a lower case assembly 30 in FIG. 3A, two module clamping means 23 installed under the top panel 21 of the upper case assembly 20 for module clamping purpose, and a metallic cushion means 24 on top of the U-shaped opening 34 of the lower case assembly in FIG. 3A.

Figure 3A:
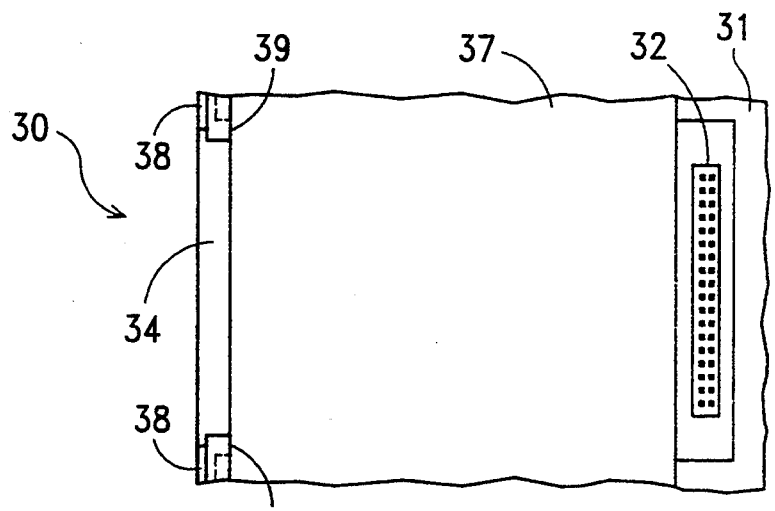
FIG. 3A is the top view of part of a lower case assembly according to the present invention.
Figure 3C:
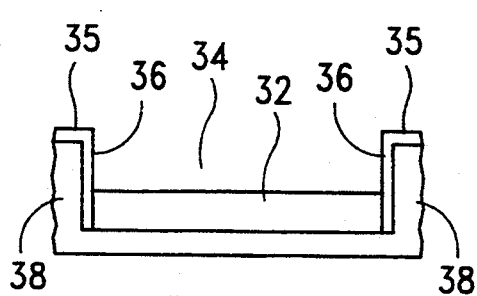
FIG. 3C is the rear view of part of a lower case assembly according to the present invention.
Figure 3B:
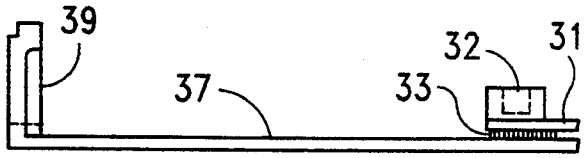
FIG. 3B is the side view of part of a lower case assembly according to the present invention.

FIGS. 3A, 3B, and 3C are the top, side and rear views of part of a lower case assembly 30 according to the present invention. The lower case assembly 30 comprises a PCB board assembly 31 having a receptacle 32 installed on it and a PCB board cushion means 33 disposed under the PCB board assembly 31, a bottom panel 37, and a vertical panel 38 on the lower case assembly 30 with a U-shaped opening 34 on its upper edge. The vertical panel 38 of the lower case assembly 30 further comprises a case assembly attachment means 35 on the top ends of the left and right sides of the U-shaped opening 34 for the attachment of the upper case assembly 20 shown on FIG. 2C.

The lower case assembly 30 further comprises two vertical rib-like devices 39 on the left and right sides of the U-shaped opening 34 wherein each of the vertical rib-like devices 39 is rigidly installed between the vertical panel 38 and the bottom panel 37 of the lower case assembly 30 to strengthen the structure of the vertical panel 38 which is substantially weakened by the U-shaped opening 34 whereby the structure of the lower case assembly 30 is greatly strengthened by the two vertical rib-like devices 39.

Figure 4A:
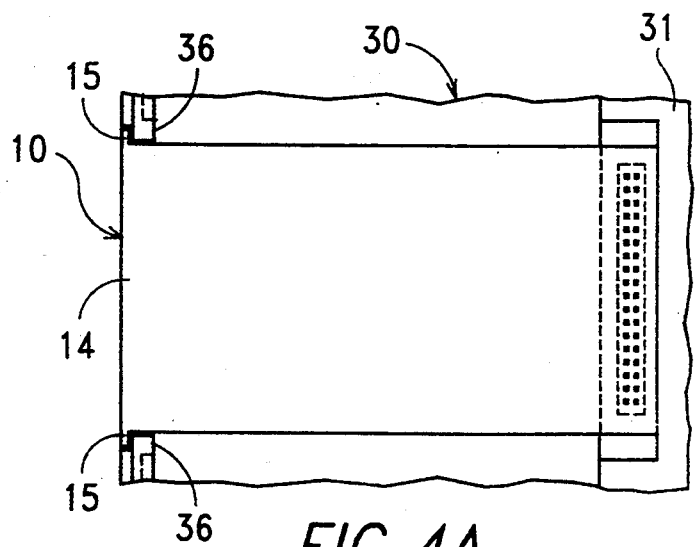
FIG. 4A is the top view of a module assembly installed to a lower case assembly according to the present invention.
Figure 4C:
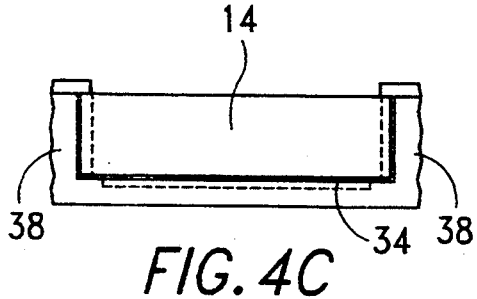
FIG. 4C is the rear view of a module assembly installed to a lower case assembly according to the present invention.
Figure 4B:
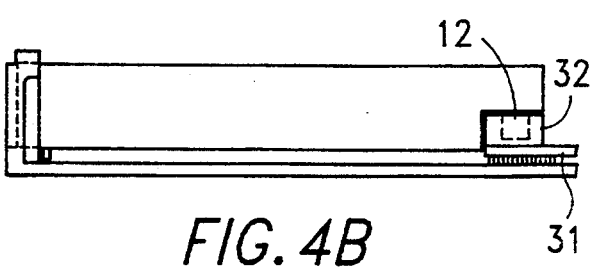
FIG. 4B is the side view of a module assembly installed to a lower case assembly according to the present invention.
Figures 5A, 5B:
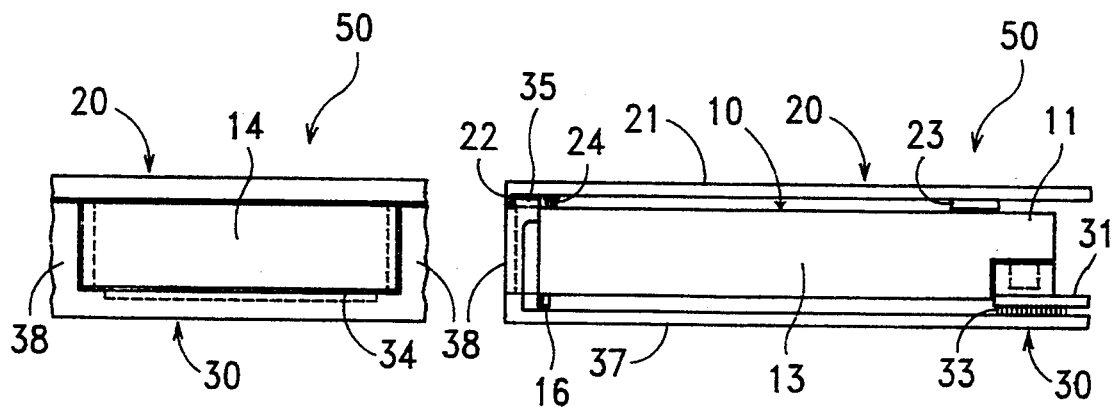
FIG. 5A is the side view of a module assembly clamped between the upper and lower case assemblies according to the present invention.
FIG. 5B is the rear view of a module assembly clamped between the upper and lower case assemblies according to the present invention.

FIG. 4A, 4B, and 4C are the top, side and rear views of the module assembly 10 installed to the lower case assembly 30 according to the present invention. The module head connector 12 is vertically connected to the receptacle 32 of the PCB board assembly 31 in a removable manner, The U-shaped opening 34 is a rear port attachment means of the lower case assembly 30 wherein the rear port 14 of the module assembly 10 is vertically attached to the U-shaped opening 34 of the vertical panel 38 in a removable manner whereby the module assembly 10 can be vertically installed to or removed from the U-shaped opening 34 of the lower case assembly 30 by hand, The inner sides of the two vertical protruding edges 15 inwardly attach to the two correspondent edges 36 of the U-shaped opening 34 of the lower case assembly 30 in a removable manner whereby the module assembly 10 can sustain more external pushing force from its rear end, FIG. 5A and 5B are the side and rear views of the module assembly 10 clamped between the upper case assembly 20 and the lower case assembly 30 according to the present invention, FIG. 5A shows that the external enclosure case 50 comprises at least two case assemblies each having at least one case assembly attachment means, One of the case assemblies comprising the top panel 21 of the external enclosure case 50 is called the upper case assembly 20 and another of the case assemblies comprising the bottom panel 37 of the external enclosure case 50 is called the lower case assembly 30. The case assembly attachment means 22 of the upper case assembly 20 engages and securely attaches to the case assembly attachment means 35 of the lower case assembly 30 in a removable manner. The upper case assembly 20 is removably and securely attached to the lower case assembly 30 by the case assembly attachment means 22 of the upper case assembly 20 and the case assembly attachment means 35 of the lower case assembly 30 when the external enclosure case 50 is closed.

The case assembly attachment means 22 of the upper case assembly 20 engages and securely attaches to the case assembly attachment means 35 of the vertical panel 38 of the lower case assembly 30 whereby the rear port 14 of the module assembly 10 is locked and secured between the upper case assembly 20 and the U-shaped opening 34 of the lower case assembly 30.

The module clamping means 23 of the upper case assembly 20 engages and removably attaches to the upper end of the area around the module body 13 or the module head 11 when the external enclosure case 50 is closed whereby the module assembly 10 and the PCB board assembly 31 are horizontally clamped between the upper case assembly 20 and the lower case assembly 30.

The metallic cushion means 24 of the upper case assembly 20 is in contact with the upper end of the rear port 14 of the module assembly 10 when the external enclosure case 50 is closed to provide the RFI/EMI protection to the modularized electronic system.

The outer side of the vertical protruding edge 16 of the rear port 14 outwardly attaches to the bottom edge of the U-shaped opening 34 of the lower case assembly 30 in a removable manner whereby the module assembly 10 can sustain more external pulling force from its rear end when the external enclosure case 50 is closed.

The PCB board cushion means 33 of the lower case assembly 30 is clamped under the PCB board assembly 31 when the module assembly 10 is clamped between the upper case assembly 20 and the lower case assembly 30 whereby the PCB board assembly 31 and the module assembly 10 are more reliably clamped between the upper case assembly 20 and the lower case assembly 30.

The basic module design presented in FIG. 1A has no other I/O ports except the rear port. The spaces on the top, bottom, left and right ends of the module body can further be used for I/O port installation because they are not used in the module mounting design. FIG. 6A to FIG. 8 present a module design which has an upper protruding port on its top end. FIG. 9A to FIG. 11 show another module design which has a lower protruding port on its lower end. FIG. 12A to FIG. 15 present a peripheral module design which has a connector on its right side. Such new I/O port designs provide more I/O module choices to module vendors and computer users. All the mounting designs of these new I/O modules are consistent with the basic module mounting design presented above.

Figure 6A:
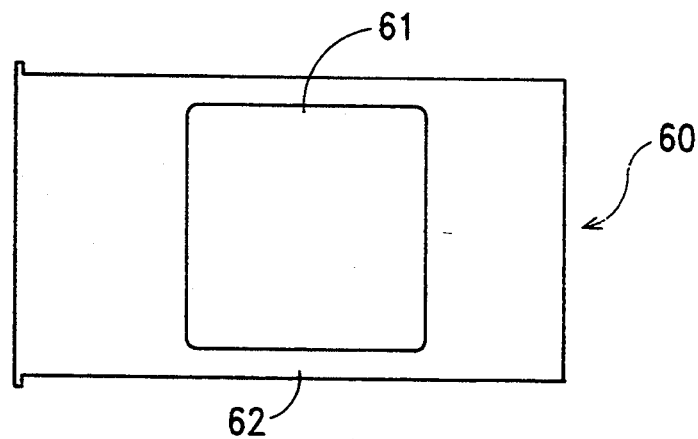
FIG. 6A is the top view of a module assembly with an upper protruding port according to the present invention.
Figure 6B:
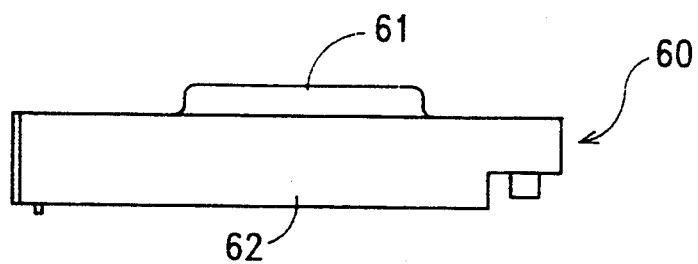
FIG. 6B is the side view of a module assembly with an upper protruding port according to the present invention.

FIG. 6A and 6B are the top and side views of a module assembly 60 with an upper protruding port 61 according to the present invention. The construction of the module assembly 60 is the same as the module assembly 10 except that it further comprises a substantially rectangular upper protruding port 61 on the upper end of its module body 62.

Figure 7:
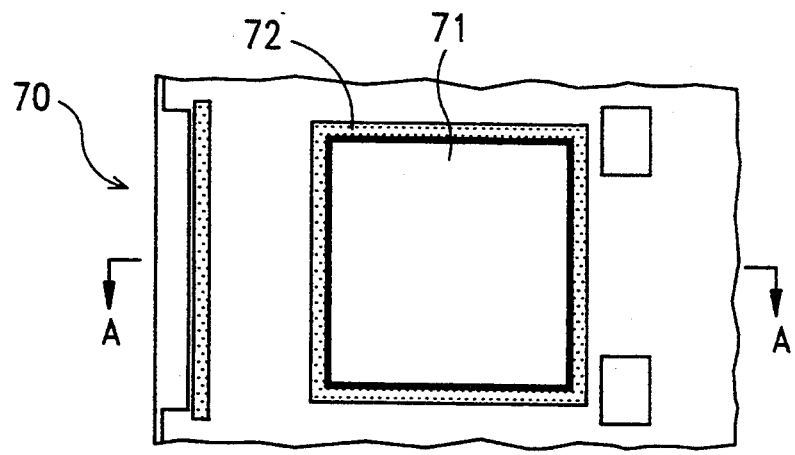
FIG. 7 is the bottom view of part of an upper case assembly with a top opening according to the present invention.
Figure 7A:
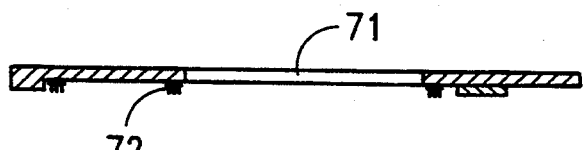
FIG. 7A is the side section view A—A of FIG. 7.

FIG. 7 and 7A are the bottom view and the side section view A—A of part of an upper case assembly 70 with a top opening 71 for the clamping of the module assembly 60 in FIG. 6A. The upper case assembly 70 comprises a correspondent top opening 71 on top of the upper protruding port 61 of the module assembly 60. The upper case assembly 70 further comprises a metallic cushion means 72 installed around the top opening 71 for RFI/EMI protection.

Figure 8:
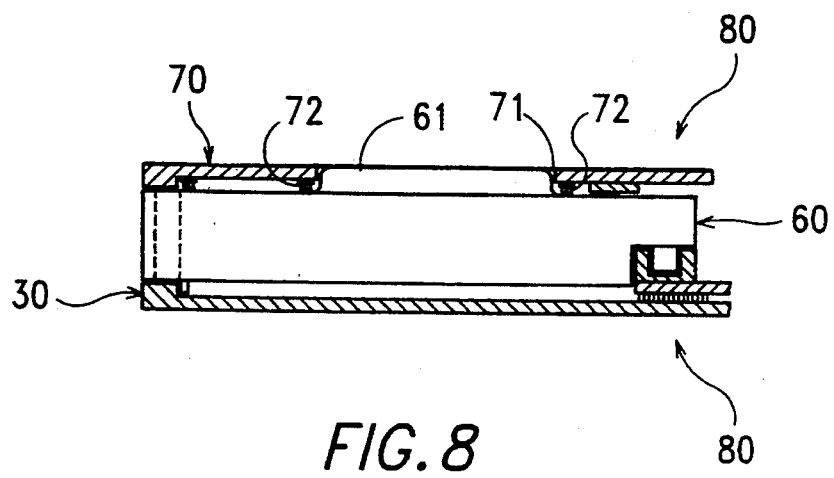
FIG. 8 is the side section view of a module assembly with an upper protruding port clamped between the upper and lower case assemblies according to the present invention.

FIG. 8 is the side section view of the module assembly 60 with the upper protruding port 61 clamped between the upper case assembly 70 and the lower case assembly 30. The upper protruding port 61 of the module assembly 60 extends through the top opening 71 of the upper case assembly 70 when the external enclosure case 80 is closed whereby the upper protruding port 61 can be accessed externally from the top. The metallic cushion means 72 of the upper case assembly 70 is in contact with the surrounding part of the upper protruding port 61 of the module assembly 60 to provide RFI/EMI protection to the modularized electronic system.

Figure 9A:
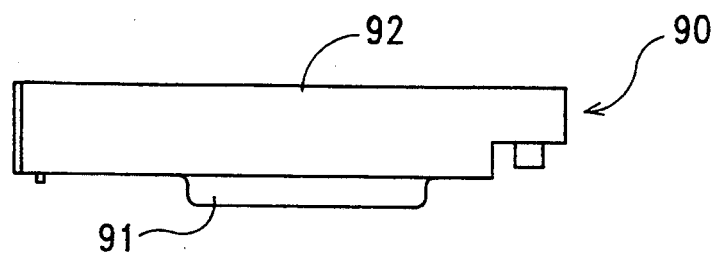
FIG. 9A is the side view of a module assembly with a lower protruding port according to the present invention.
Figure 9B:
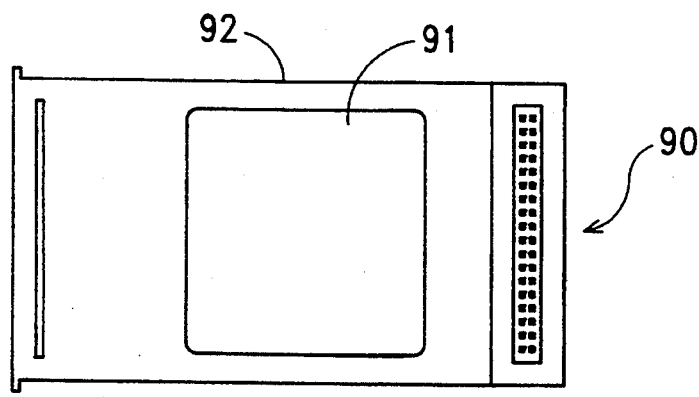
FIG. 9B is the bottom view of a module assembly with a lower protruding port according to the present invention.

FIG. 9A and 9B are the side and bottom views of a module assembly 90 with a lower protruding port 91 according to the present invention. The construction of the module assembly 90 is the same as the module assembly 10 except that it further comprises a substantially rectangular lower protruding port 91 on the bottom end of the module body 92.

Figure 10:
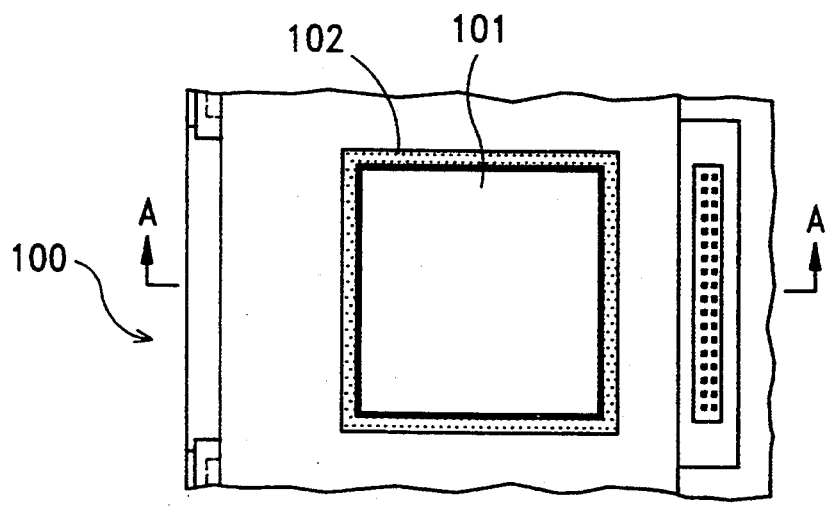
FIG. 10 is the top view of part of a lower case assembly with a bottom opening according to the present invention.
Figure 10A:
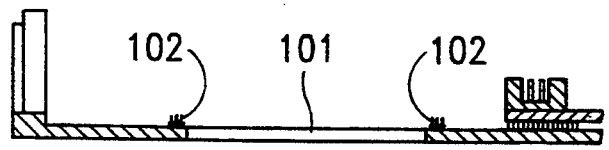
FIG. 10A is the side section view A—A of FIG. 10.

FIG. 10 and 10A are the top view and the side section view A—A of part of an lower case assembly 100 with a bottom opening 101 for the clamping of the module assembly 90 in FIG. 9A. The lower case assembly 100 comprises a correspondent bottom opening 101 under the lower protruding port 91 of the module assembly 90. The lower case assembly 100 further comprises a metallic cushion means 102 installed around the bottom opening 101 for RFI/EMI protection.

Figure 11:
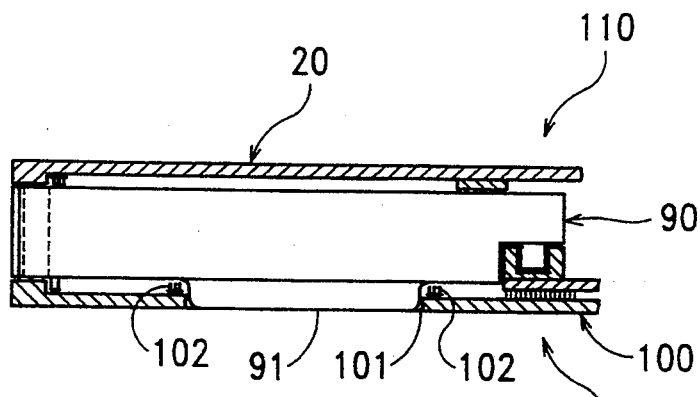
FIG. 11 is the side section view of a module assembly with a lower protruding port clamped between the upper and lower case assemblies according to the present invention.

FIG. 11 is the side section view of the module assembly 90 with the lower protruding port 91 clamped between the upper case assembly 20 and the lower case assembly 100. The lower protruding port 91 of the module assembly 90 extends through the bottom opening 101 of the lower case assembly 100 when the external enclosure case 110 is closed whereby the lower protruding port 91 can be accessed externally from the bottom side. The metallic cushion means 102 of the lower case assembly 100 is in contact with the surrounding part of the lower protruding port 91 of the module assembly 90 to provide RFI/EMI protection to the modularized electronic system.

Many peripheral modules such as hard drives or CD-ROM installed inside a desktop or notebook computers use screws as their mounting means and flexible cables as the electronic interfaces to computer systems. Such designs are both complex and vulnerable. FIG. 12A to FIG. 15 present a new peripheral module and mounting design which is consistent with the module and mounting designs introduced previously and also can eliminate the traditional flexible cables by direct module-to-module connections.

Figure 12C:
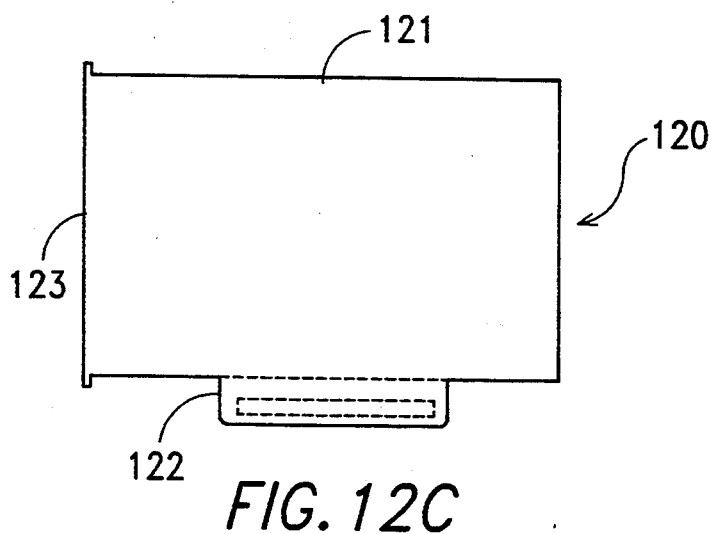
FIG. 12C is the top view of a peripheral module according to the present invention.
Figure 12A:
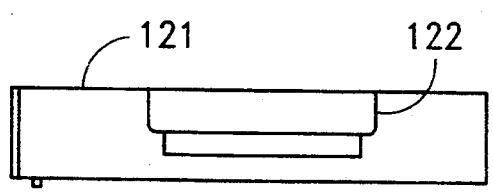
FIG. 12A is the front view of a peripheral module according to the present invention.
Figure 12B:
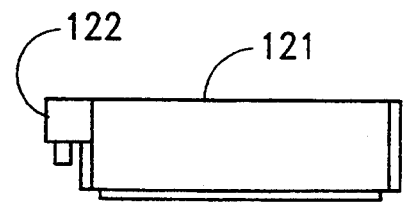
FIG. 12B is the side view of a peripheral module according to the present invention.

FIG. 12A, 12B, and 12C are the front, side and top views of a peripheral module 120 according to the present invention. The peripheral module 120 comprises a substantially rectangular peripheral body 121 with a vertical peripheral connector 122 on the right side facing downward direction. The peripheral module 120 further comprises a substantially rectangular rear port 123 rigidly and horizontally connected to the rear end of the peripheral body 121.

Figure 13:
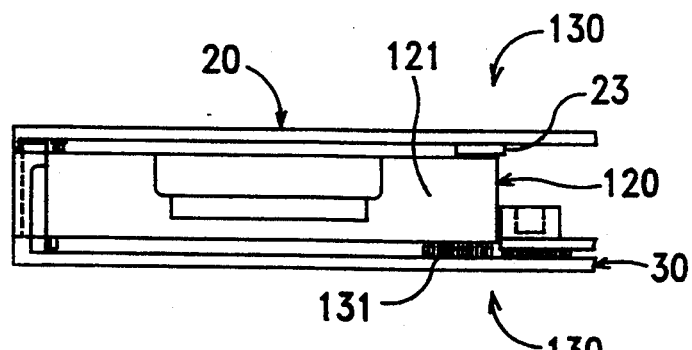
FIG. 13 is the side view of a peripheral module clamped between the upper and lower case assemblies according to the present invention.

FIG. 13 is the side view of the peripheral module 120 clamped between the upper case assembly 20 and the lower case assemblies 30. The lower case assembly 30 further comprises a cushion means 131 under the peripheral body. 121 to support the front end of the peripheral module 120 whereby the peripheral module 120 can be reliably mounted to the lower case assembly 30 horizontally. The upper case assembly 20 further comprises another module clamping means 23 above the peripheral body 121 wherein the module clamping means 23 of the upper case assembly 20 is in contact with the upper end of the peripheral body 121 whereby the peripheral module 120 is reliably clamped between the upper case assembly 20 and the lower case assembly 30 when the external enclosure case 130 is closed.

Figure 14:
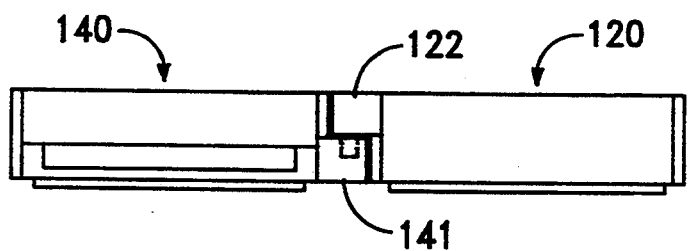
FIG. 14 is the front view of a module assembly and a peripheral module connecting together according to the present invention.

FIG. 14 is the front view of a module assembly 140 and the peripheral module 120 connecting together. The construction of the module assembly 140 is the same as the module assembly 10 except that it further comprises a peripheral receptacle 141 on its left side facing upward direction. The vertical peripheral connector 122 can also be installed on the left side of the peripheral module 120 if the correspondent peripheral receptacle 141 of the module assembly 140 can also be switched to the right side of its module body. The peripheral connector 122 of the peripheral module 120 is vertically and removably connected to the peripheral receptacle 141 of the module assembly 140 for transmitting signals or power.

Figure 15:
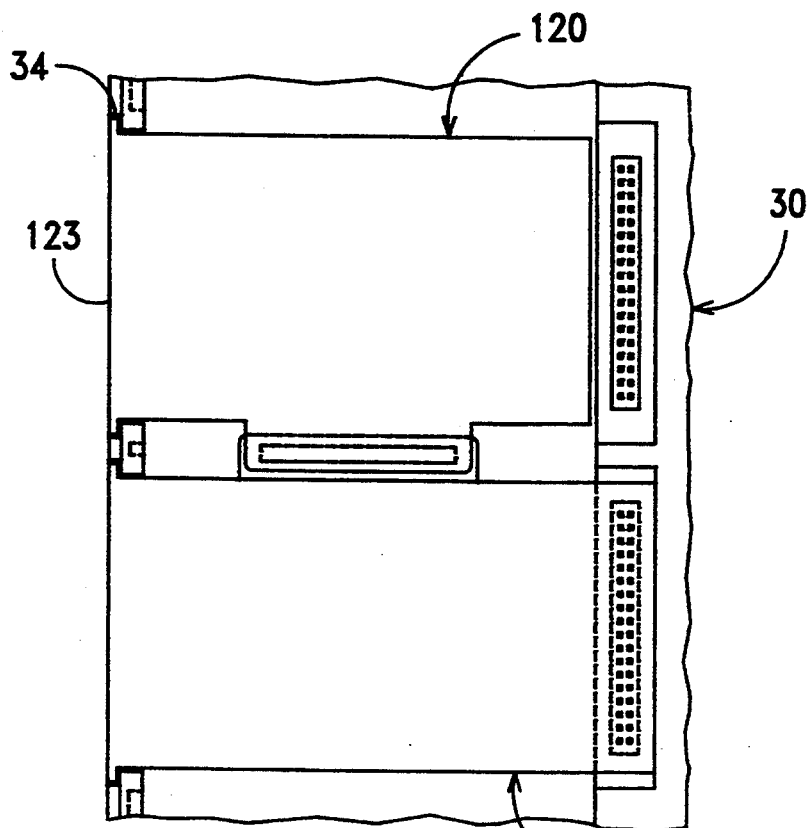
FIG. 15 is the top view of the modules in FIG. 14 installed to a lower case assembly according to the present invention.

FIG. 15 is the top view of the two modules 140 and 120 in FIG. 14 installed to the lower case assembly 30. FIG. 15 shows that the lower case assembly 30 further comprises a correspondent rear port attachment means 34 behind the rear port. 123 wherein the rear port 123 of the peripheral module 120 is vertically and removably attached to the rear port attachment means 34 of the lower case assembly 30. The rear port attachment means 34 is a U-shaped opening which is shown on FIG. 3C. Many peripheral devices can use such peripheral module arrangement to solve their mounting and cable connection problems inside such modularized electronic systems.

The peripheral module design presented above allows many peripheral devices be easily installed inside an external enclosure case in a very simple manner. But such design may cause some inconvenience if a peripheral module needs to be changed frequently. FIG. 16A to FIG. 20 show an external module and mounting design which can solve this problem.

Figure 16A:
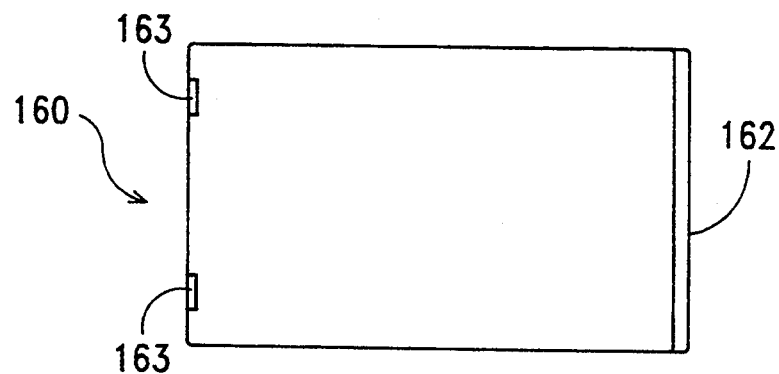
FIG. 16A is the top view of an external module assembly according to the present invention.
Figure 16C:
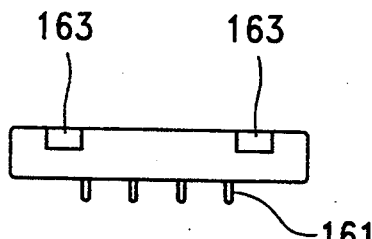
FIG. 16C is the rear view of an external module assembly according to the present invention.
Figure 16B:
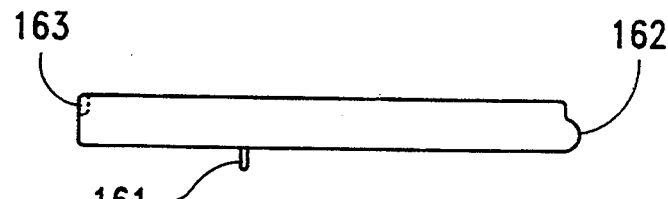
FIG. 16B is the side view of an external module assembly according to the present invention.

FIG. 16A, 16B, and 16C are the top, side and rear views of an external module assembly 160 according to the present invention. The external module assembly 160 comprises a module connector 161 rigidly installed on its bottom for transmitting signals or power. It further comprises an external module attachment means which is a removable hinge device 162 on one end and a latching means 163 on the opposite end of the external module assembly 160.

Figure 17:
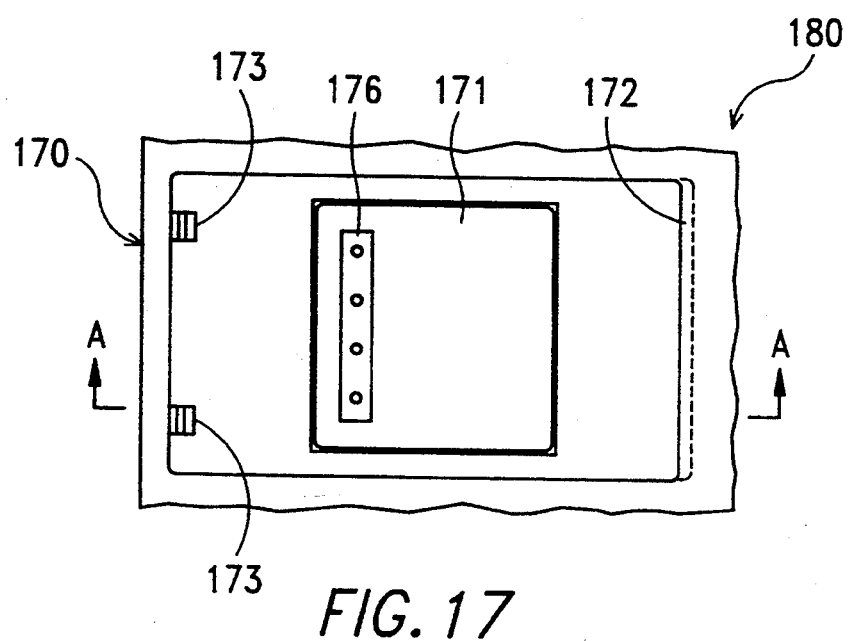
FIG. 17 is the top view of part of a loaded external enclosure case with an external module attachment receiving means on top of the upper case assembly according to the present invention.
Figure 18:
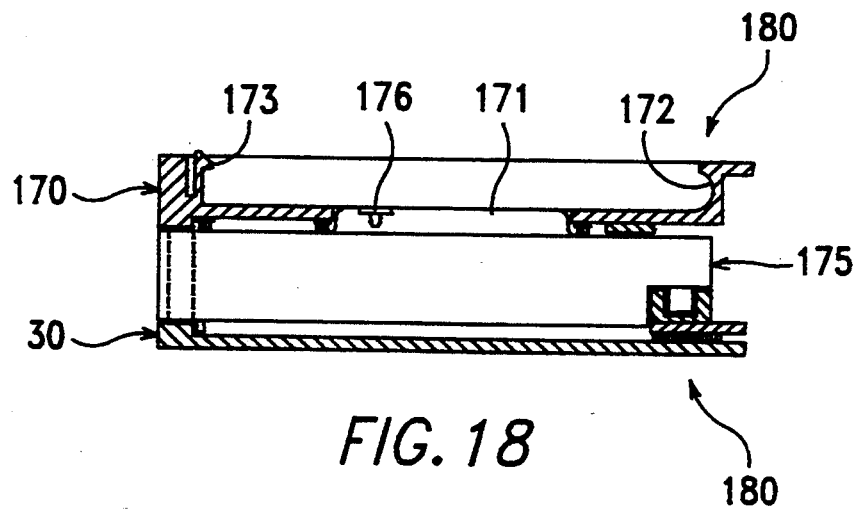
FIG. 18 is the side section view A—A of FIG. 17.

FIG. 17 is the top view of part of a loaded external enclosure case 180 with an external module attachment receiving means on top of the upper case assembly for the attachment of the external module assembly 160 and FIG. 18 is the side section view A—A of FIG. 17. FIGS. 17 and 18 show that the upper case assembly 170 of the external enclosure case 180 further comprises a correspondent external module attachment receiving means which is a hinge receiving device 172 on one side and a latch receiving means 173 on the other side of the upper protruding port 171. It also shows that the upper protruding port 171 of the module assembly 175 further comprises a correspondent receptacle 176 for the vertical connection of the module connector 161 of the eternal module assembly 160.

Figure 19:
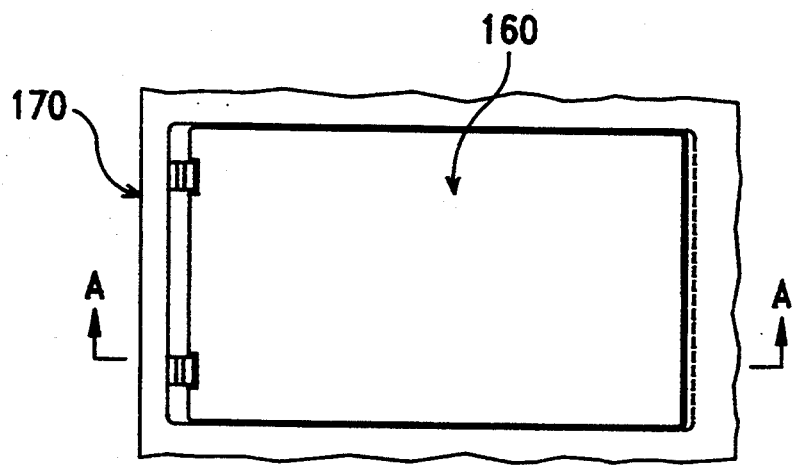
FIG. 19 is the top view of an external module assembly loaded on the external module attachment receiving means of an upper case assembly according to the present invention.
Figure 20:
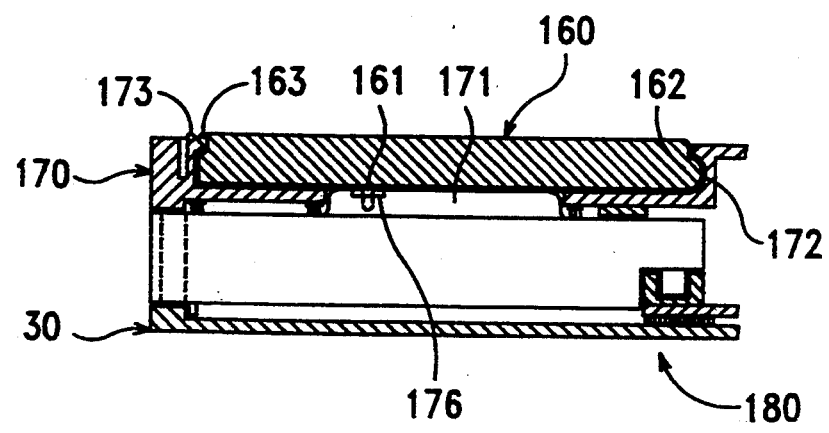

FIG. 19 is the top view of the external module assembly 160 loaded on the external module attachment receiving means of the upper case assembly 170 and FIG. 20 is the side section view A—A of FIG. 19. FIGS. 19 and 20 show that the modularized electronic system further comprises a substantially rectangular external module assembly 160 installed on top of the upper protruding port 171. The module connector 161 of the external module assembly 160 is vertically and removably connected to the receptacle 176 of the upper protruding port 171. The external module attachment means 162 and 163 of the external module assembly 160 engage and securely attach to the external module attachment receiving means 172 and 173 of the upper case assembly 170 in a removably manner whereby the external module assembly 160 can be easily removed and replaced externally by hand. The removable hinge device 162 of the external module assembly 160 engages and removably attaches to the hinge receiving device 172 of the upper case assembly 170 on one end and the latching means 163 of the external module assembly 160 engages and removably latches to the latch receiving means 173 of the upper case assembly 170 on the other end whereby the external module assembly 160 can be easily attached to or removed from the upper case assembly 170 by hand.

The case design for loading all the internal modules presented above are very important because they must preserve the following characters: low profile, shock resistance, reliable for module mounting and easy to use. FIGS. 21 to 26 present a basic case design which provides many details for the design and construction of such low profile external enclosure cases.

Figure 21:
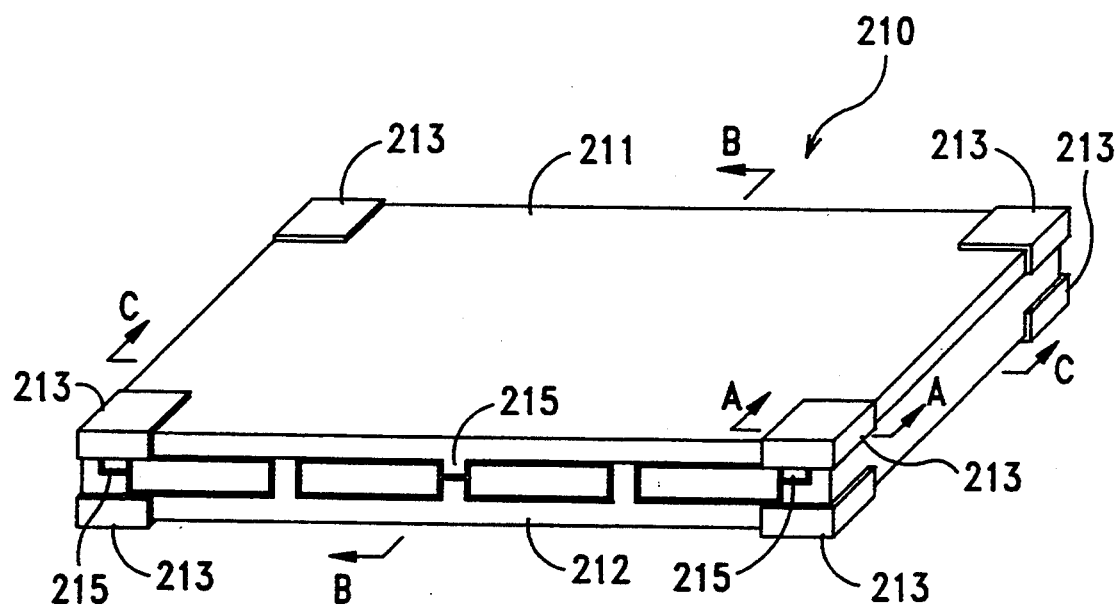
FIG. 21 is the perspective view of an loaded external enclosure case according to the present invention.

FIG. 21 is the perspective view of an loaded external enclosure case 210 according to the present invention. The external enclosure case 210 comprises an upper case assembly 211, a lower case assembly 212, eight shock protection devices 213 attached externally on eight case corners, and three case latching means 215. The detail construction of the external enclosure case 210 and its internal components will be explained in FIG. 22 to FIG. 26B series.

Figure 22:
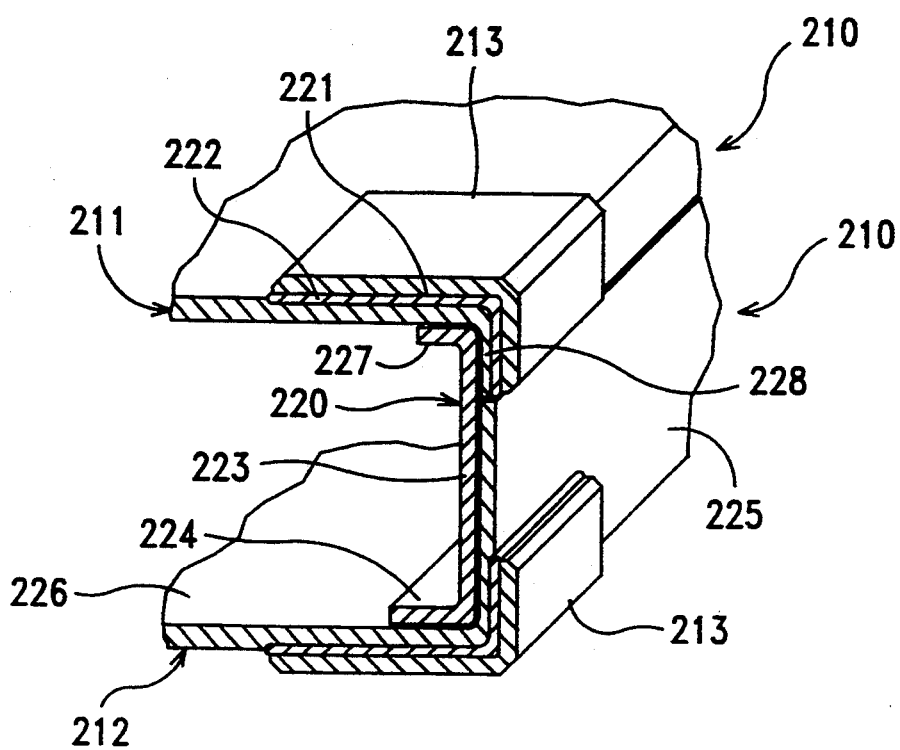
FIG. 22 is the side section view A—A of FIG. 21 which shows part of two case corners with two shock protection devices installed according to the present invention.

FIG. 22 is the side section view A—A of FIG. 21 which shows part of two case corners with two shock protection devices 213 installed. Please refer to FIGS. 21 and 22 for the complete outlook of the shock protection device 213. The shock protection device 213 of the external enclosure case 210 is a corner-like device having a corner-shaped concave side 221 on its back. The shock protection device 213 is made of rigid material and has a cushion means 222 covering on the surface of the concave side 221. The shock protection device 213 is permanently attached to a case corner of the external enclosure case 210 externally with the cushion means 222 bound in between whereby the case corner of the external enclosure case 210 can sustain much bigger external shocking force by distributing the external shocking force over the cushion means 222 to avoid possible structural damage.

The lower case assembly 212 further comprises a case frame 220 which is made of rigid material and has a vertical side panel 223 and an inward L-shaped bottom panel 224 on its lower end wherein the case frame 220 is permanently bound to the inner sides of the vertical panel 225 and the bottom panel 226 of the lower case assembly 212 to strengthen its case structure.

The case frame 220 further comprises an inward L-shaped top end 227 on top of the vertical side panel 223 of the case frame 220 as the case assembly attachment means of the lower case assembly 212 and the upper case assembly 211 further comprises a lower protruding edge 228 as the correspondent case assembly attachment means wherein the inner side of the lower protruding edge 228 of the upper case assembly engages and securely attaches to the outer side of the inward L-shaped top end 227 of the lower case assembly 212 in a removable manner when the external enclosure case 210 is closed whereby the contacting areas between the upper case assembly 211 and the lower case assembly 212 are greatly expanded by the inward L-shaped top end 227 and thus dramatically reduces the possibility of structural damages to the contacting areas by external shocking forces.

Figures 23A, 23B, 23C:
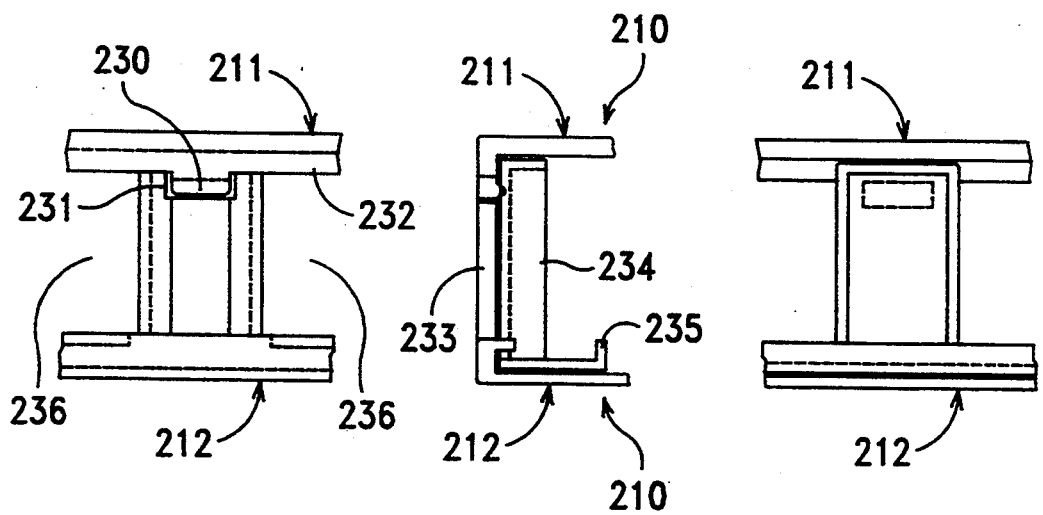
FIG. 23A is the front view of both the upper and lower case assemblies attached together by a case latching means according to the present invention.
FIG. 23B is the side view of both the upper and lower case assemblies attached together by a case latching means according to the present invention.
FIG. 23C is the rear view of both the upper and lower case assemblies attached together by a case latching means according to the present invention.

FIG. 23A, 23B, and 23C are the front, side and rear views of part of the upper and lower case assemblies attached together by a case latching means. The side panel 233 comprises a case frame 234 permanently bound to it to strengthen its structure which is substantially weakened by the two U-shaped openings 236. The case assembly attachment means 230 of the upper case assembly 211 is a latching means installed on the lower end of one of its side panels 232 and the correspondent case assembly attachment means 231 of the lower case assembly 212 is a latch receiving means installed on top of the case frame 234 of the lower case assembly 212. Please refer to 215 in FIG. 21 and 240 of FIG. 24 for the disposition of this case latching means. FIG. 23A shows that the latching means 230 of the upper case assembly 211 engages and securely latches to the latch receiving means 231 of the lower case assembly 212 in a removably manner whereby the external enclosure case 210 can be easily opened or closed by hand.

The case frame 234 further comprises a vertical edge 235 along the inner end of the inward L-shaped bottom panel of the case frame 234 to strengthen the case frame structure which is substantially weakened by the U-shaped opening 236 of the lower case assembly 212.

Figure 24:
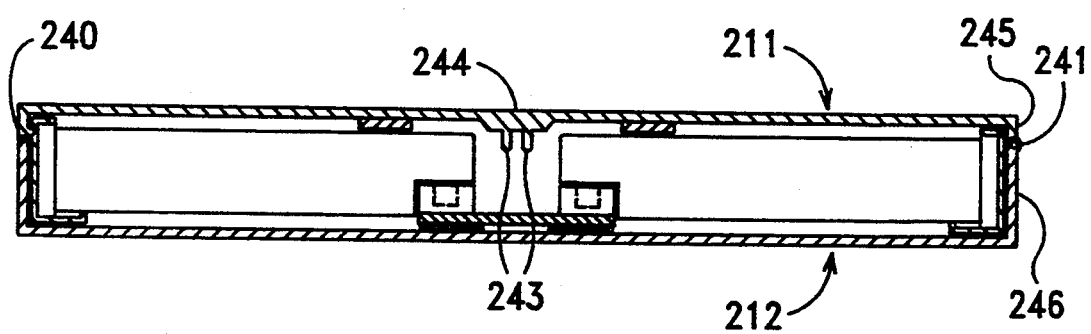
FIG. 24 is the side section view B—B of FIG. 21.

FIG. 24 is the side section view B—B of FIG. 21 which shows the attachment between the upper case assembly 211 and the lower case assembly 212. The upper case assembly 211 and the lower case assembly 212 are further connected together by a hinge device 241 wherein the hinge device 241 is installed between the lower end of one of the side panels 245 of the upper case assembly 211 and the top end of a correspondent side panel 24B of the lower case assembly 212 whereby the upper case assembly 211 and the lower case assembly 212 are reliably connected together by the hinge device 241 and can be easily closed or opened like a clam shell.

The upper case assembly 211 further comprises a rib-like device 243 under the top panel 244 of the upper case assembly 211 to strengthen the case structure of the upper case assembly 211 for multiple module clamping.

Figure 25:
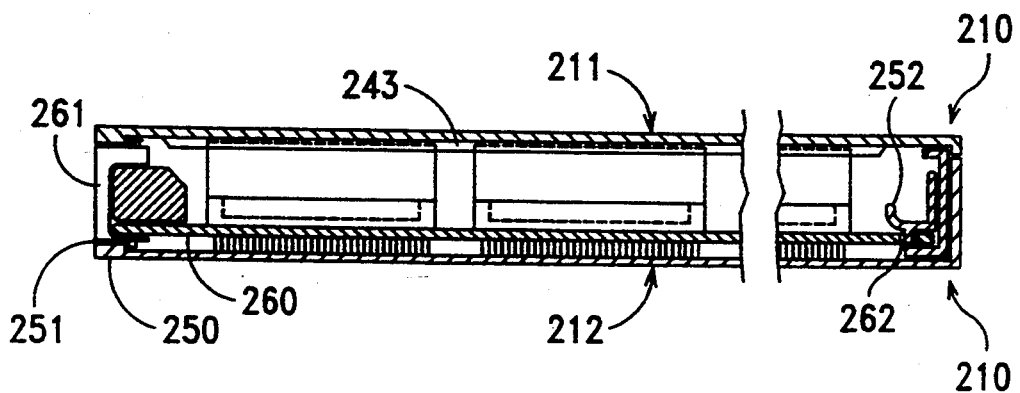
FIG. 25 is another side section view C—C of FIG. 21.

FIG. 25 also shows the disposition of this rib-like device 243.

Figure 26A:
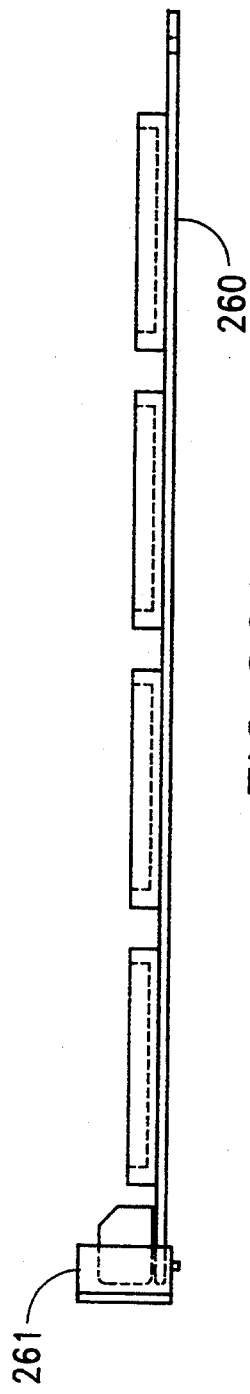
FIG. 26A is the side view of a PCB board assembly according to the present invention.
Figure 26B:
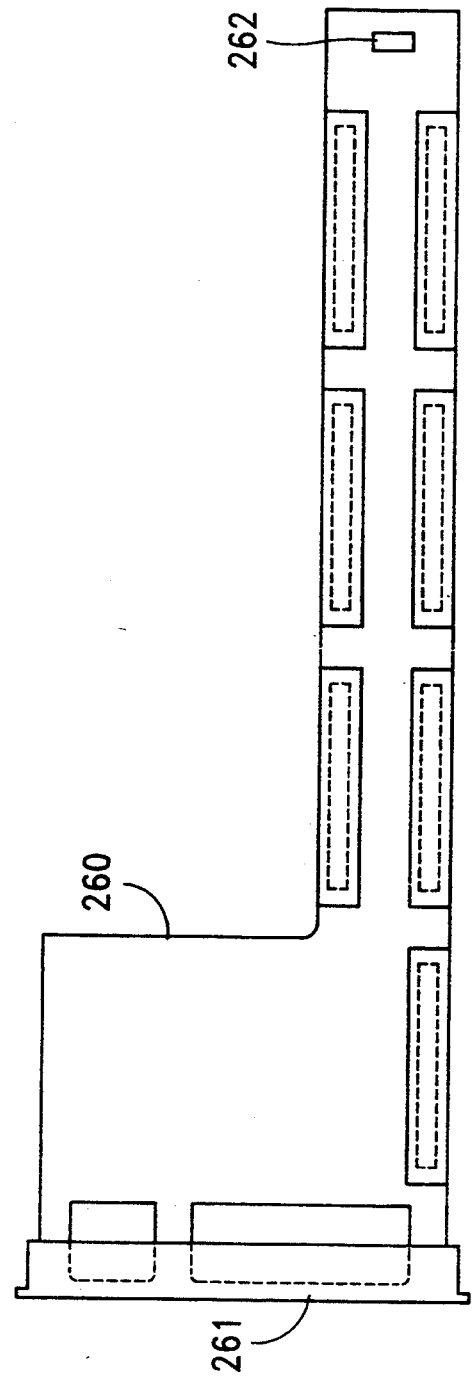
FIG. 26B is the top view of a PCB board assembly according to the present invention.

FIG. 25 is another side section view C—C of FIG. 21 which shows the attachment of a PCB board assembly 260 inside the external enclosure case 210 and FIGS. 26A and 26B are the side and top views of the PCB board assembly 260. FIG. 26B shows that the PCB board assembly 260 comprises two PCB board attachment means: a substantially rectangular side port 261 and a latching means 262. FIG. 25 shows that the lower case assembly 212 also comprises two correspondent PCB board attachment receiving means: a U-shaped opening 251 and a latching receiving means 252 wherein the PCB board attachment means of the PCB board assembly 260 engage and securely attach to the PCB board attachment receiving means of the lower case assembly 212 in a removable manner.

The constructions of the side port 261 and the correspondent U-shaped opening 251 are similar to the constructions of the rear port 14 and the U-shaped opening 34 in FIG. 5B. The side port 261 of the PCB board assembly 260 is installed on its left end and the correspondent U-shaped opening 251 of the lower case assembly 212 is disposed on top of a vertical panel 250 wherein the side port 261 of the PCB board assembly 260 engages and vertically attaches to the U-shaped opening 251 of the lower case assembly 212 in a removable manner whereby the PCB board assembly 260 can be easily installed to or removed from the lower case assembly 212 by hand.

The PCB board attachment means 262 is a latching means which is a narrow groove and is installed on the right end of the PCB board assembly 260 and the PCB board attachment receiving means 252 of the lower case assembly 212 is a correspondent flexible narrow, protruding edge as the latch receiving means wherein the latching means 262 of the PCB board assembly 260 engages and removably latches to the latch receiving means 252 of the lower case assembly 212 whereby the PCB board assembly 260 can be easily installed to or removed from the lower case assembly 212 by hand.

Many input devices such as keyboard, pen-based screen, etc. are usually fixed on the upper case assembly of the notebook or palmtop computers. Such permanent installations are not user replaceable and there is no modular standard for such input devices. If these input devices can be modularized as external modules and can be installed or replaced by hand easily, it will make the portable computers more applicable to many applications because the computer users will have many choices which they can select and install by themselves just like other peripheral devices. FIG. 27A to FIG. 30 introduce a new external module and its mounting design for this purpose.

Figure 27C:
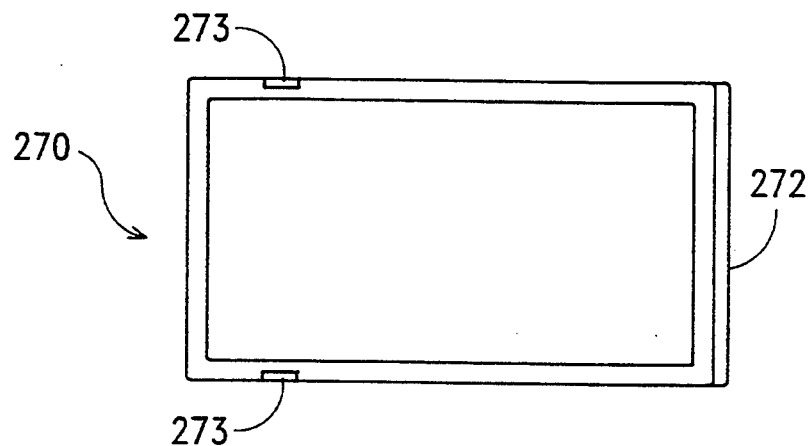
FIG. 27C is the top view of an external pen-based module according to the present invention.
Figure 27A:
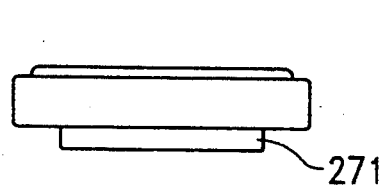
FIG. 27A is the front view of an external pen-based module according to the present invention.
Figure 27B:
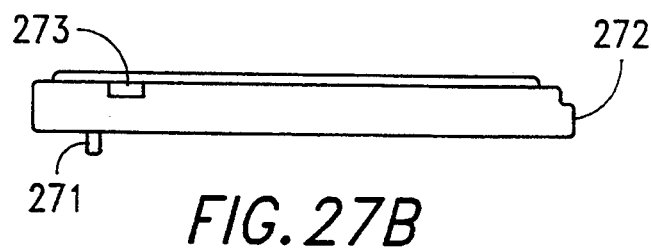
FIG. 27B is the side view of an external pen-based module according to the present invention.

FIG. 27A, 27B, and 27C are the front, side and top views of an substantially rectangular external module assembly 270 which is a pen-based screen. The external module assembly 270 comprises a module connector 271 rigidly installed on its bottom for transmitting signals or power. The external module assembly 270 further comprises an external module attachment means which is a removable hinge device 272 on one end and a latching means 273 on the opposite end of the external module assembly 270.

Figure 28:
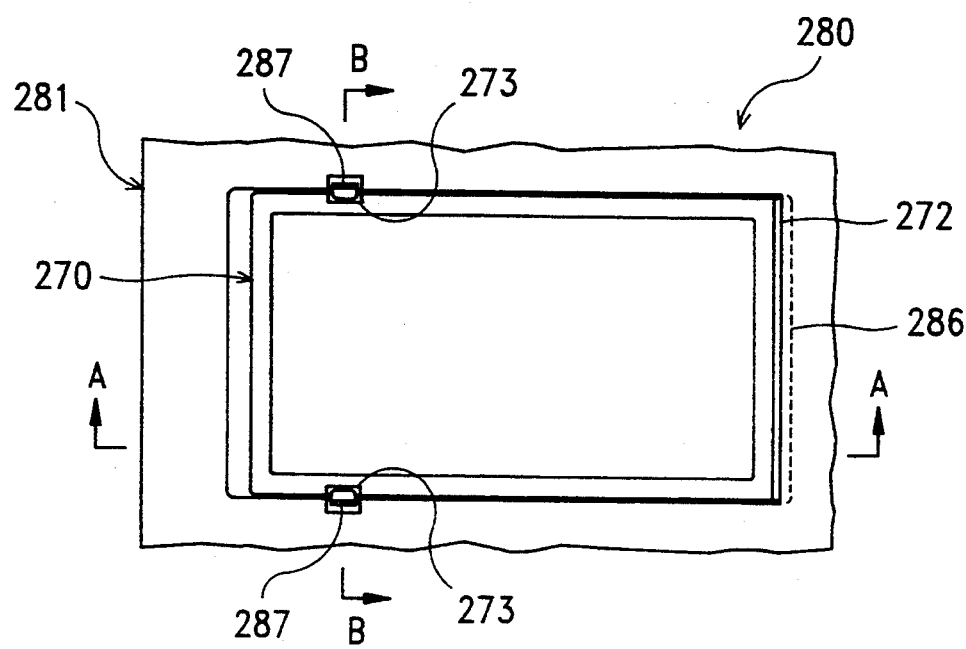
FIG. 28 is the top view of an external pen-based module attached to an external enclosure case according to the present invention.
Figure 29:
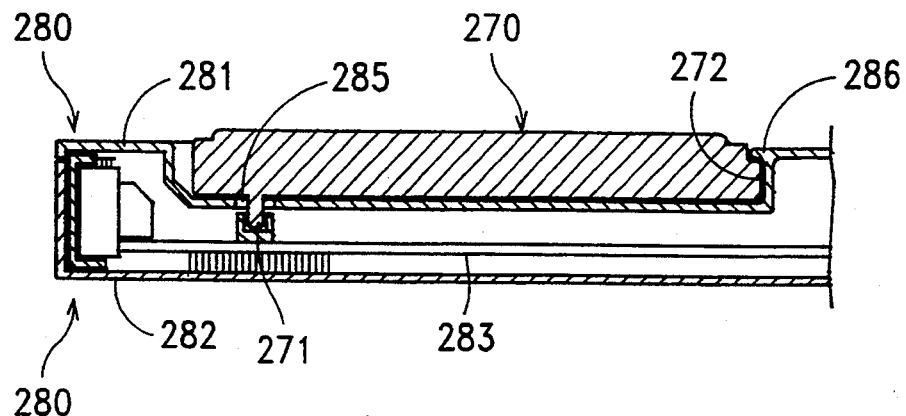
FIG. 29 is the side section view A—A of FIG. 28.
Figure 30:
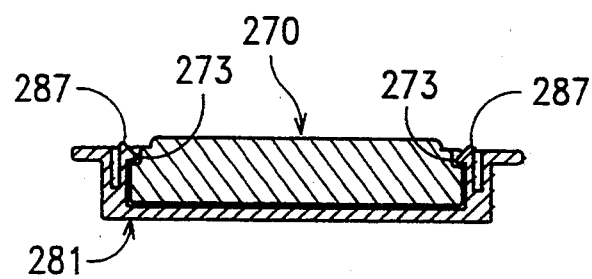
FIG. 30 is another side section view B—B of FIG. 28.

FIG. 28 is the top view of the external module assembly 270 attached to the top of the upper case assembly 281 of the external enclosure case 280. FIGS. 29 and 30 are two different side section views A—A and B—B of FIG. 28 showing the PCB board connection and the module attachment means of the external module assembly 270.

FIG. 28 shows that the upper case assembly 281 comprises an external module attachment receiving means which is a hinge receiving device 286 on one side and a latch receiving means 287 on the opposite side. The external module attachment means of the external module assembly 270 engages and securely attaches to the external module attachment receiving means of the upper case assembly 281 in a removable manner whereby the external module assembly 270 can be easily removed and replaced externally by hand. FIGS. 29 and 30 further show that the removable hinge device 272 of the external module assembly 270 engages and removably attaches to the hinge receiving device 286 of the upper case assembly 281 on one end and the latching means 273 of the external module assembly 270 engages and removably latches to the latch receiving means 287 of the upper case assembly 281 on the other end whereby the external module assembly 270 can be easily attached to or removed from the upper case assembly 281 by hand.

FIG. 29 shows that the upper case assembly 281 further comprises an opening 285 under the module connector 271 of the external module assembly 270 and the PCB board assembly 283 attached to the lower case assembly 282 further comprises a receptacle 284 wherein the module connector 271 of the external module assembly 270 is vertically and removably connected to the receptacle 284 of the PCB board assembly 283 through the opening 285 of the upper case assembly 281.

Many traditional modules such as 3.5" or 5.25" drives, power supplies, batteries, etc. are pretty big. The case clamping method presented in FIG. 5A is good for mounting those low profile modules. But if it is necessary to load both the traditional high profile modules and the new low profile modules together in a case, it would be difficult to use such case clamping method to mount those low profile modules because the internal space above the low profile modules is too high for module clamping. Two mounting methods are designed for this purpose. The first one is a mounting kit design which will be shown on FIGS. 31 and 32. The mounting kit is designed to be used for the mounting of those low profile modules in medium height computer eases, ie. the case height is about twice of the low profile nodule height. The second mounting method is a module clamping device which will be shown on FIGS. 33 and 34. The module clamping device can be used for low profile module mounting in very high computer cases because it basically does not rely on the upper case assembly for the module mounting.

Figure 31:
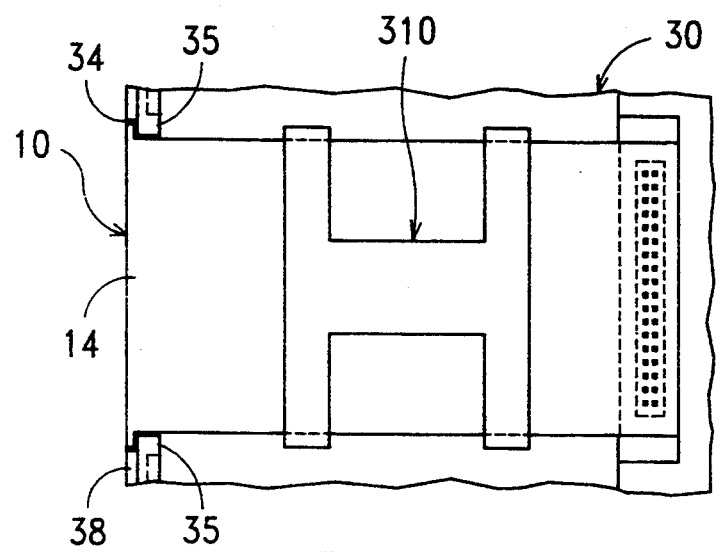
FIG. 31 is the top view of a mounting kit loaded on top of a module assembly according to the present invention.
Figure 32:
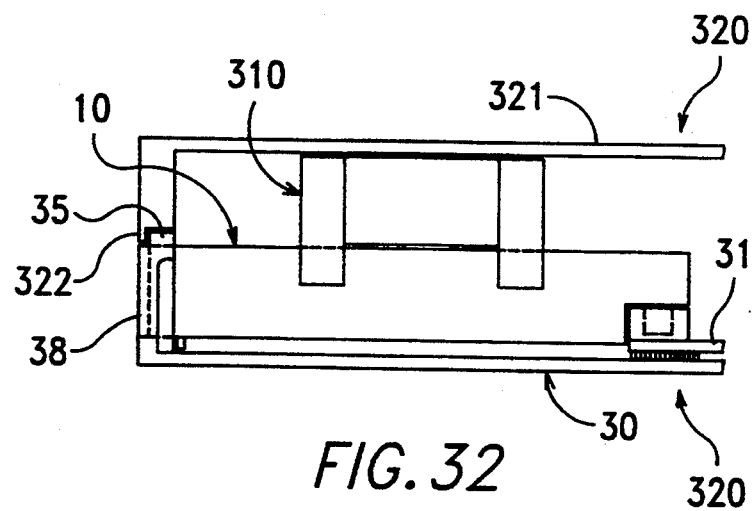
FIG. 32 is the side view of a mounting kit and a module assembly clamped between an upper and lower case assemblies according to the presentation invention.

FIG. 31 is the top view of a mounting kit 310 loaded on top of the module assembly 10 and FIG. 32 is the side view of the mounting kit 310 and the module assembly 10 clamped between an upper case assembly 321 and the lower case assembly 30. FIG. 32 shows that the mounting kit 310 is disposed on top of the module assembly 10 in a removable manner wherein the mounting kit 310 is reliably clamped between the upper case assembly 321 and the nodule assembly 10 when the external enclosure case 320 is closed whereby the module assembly 10 and the PCB board assembly 31 are horizontally clamped between the upper case assembly 321 and the lower case assembly 30 by the assistance of the mounting kit 310. Irregular external enclosure cases or non-standard module assemblies can use such mounting kits as the assisting mounting devices for module clamping.

FIGS. 31 and 32 further show that the rear port attachment means of the lower case assembly 30 is a vertical panel 38 with a U-shaped opening 34 on its upper edge. The vertical panel 38 of the lower case assembly 30 further comprises a case assembly attachment means 35 on the top ends of the left and right sides of the U-shaped opening 34 and the upper case assembly 321 further comprises a correspondent case assembly attachment means 322 wherein the case assembly attachment means 322 of the upper case assembly 321 engages and securely attaches to the case assembly attachment means 35 of the vertical panel 38 of the lower case assembly 30 whereby the rear port 14 of the module assembly 10 is locked and secured between the upper case assembly 321 and the U-shaped opening 34 of the lower case assembly 30.

Figure 33:
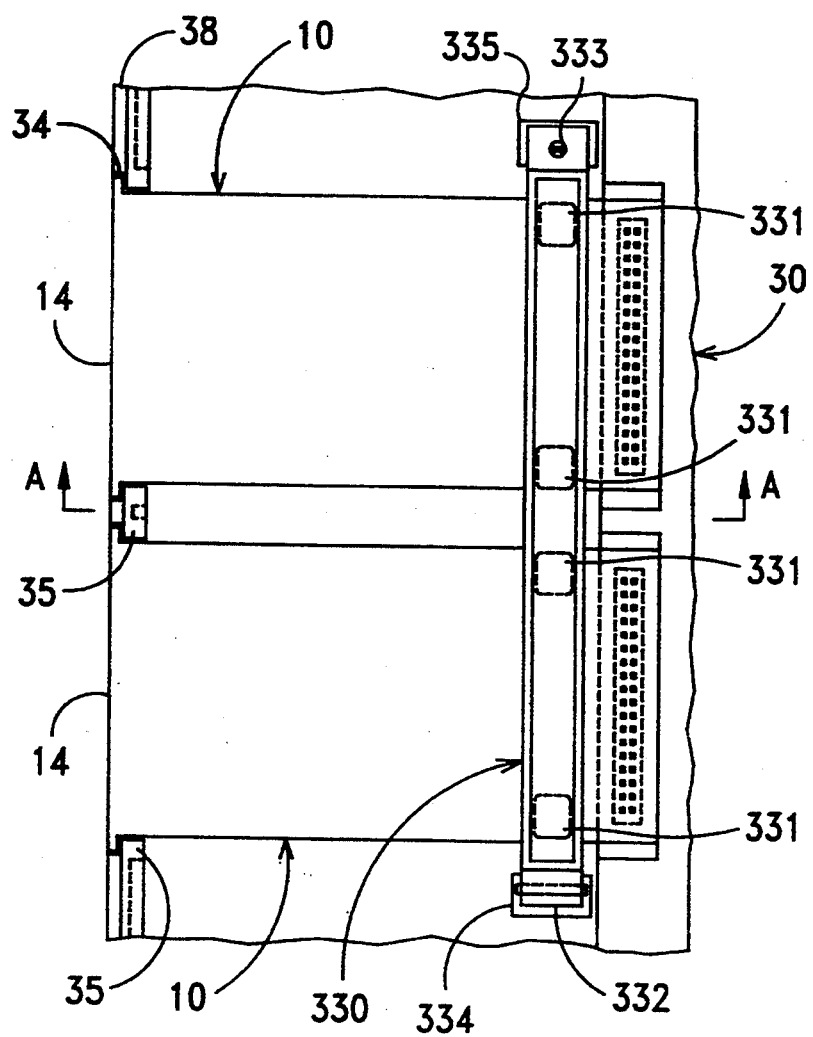
FIG. 33 is the top view of a module clamping device with two module assemblies clamped under it according to the present invention.
Figure 34:
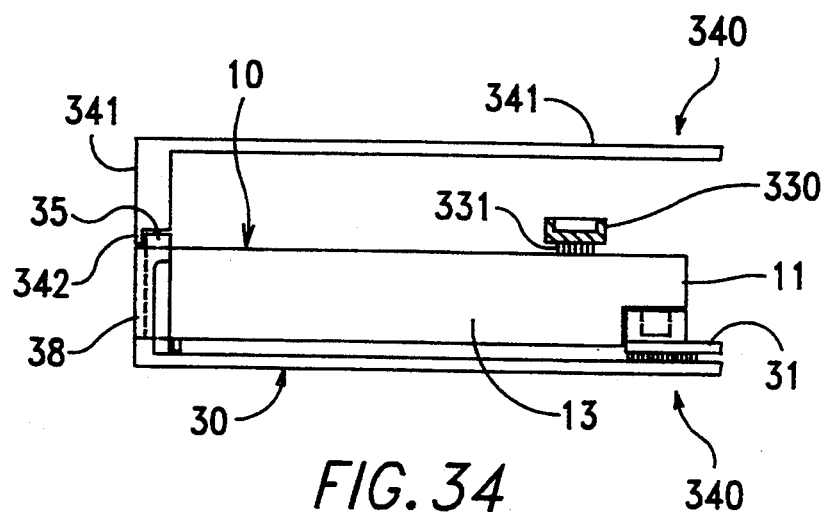
FIG. 34 is the side section view A—A of a module assembly clamped by the module clamping device according to the present invention.
Figure 35A:
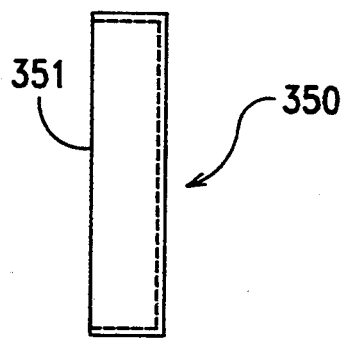
FIG. 35A is the top view of a shoulder cap according to the present invention.
Figure 35D:
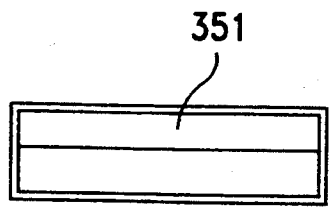
FIG. 35D is the rear view of a shoulder cap according to the present invention.
Figure 35C:
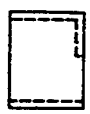
FIG. 35C is the side view of a shoulder cap according to the present invention.
Figure 35B:
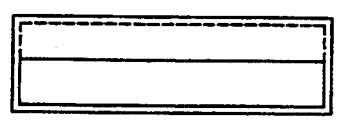
FIG. 35B is the front view of a shoulder cap according to the present invention.

FIG. 33 is the top view of a module clamping device 330 with two module assemblies 10 clamped under it and FIG. 34 is the side section view A—A of one module assembly 10 clamped by the module clamping device 330.

FIG. 33 shows that the module clamping device 330 has a device attachment means which is a hinge device 332 on one end and a screw mounting device 333 on the other end. The lower case assembly 30 comprises a correspondent device receiving means which is a hinge receiving device 334 on one end and a screw receiving device 335 on the other end for the attachment of the module clamping device 330. The module clamping device 330 further comprises four module clamping means 331 on its lower end wherein the module clamping means 331 of the module clamping device 330 engages and removably attaches to the upper end of the area around the module body 13 or the module head 11 when the device attachment means of the module clamping device 330 engages and securely attaches to the device receiving means of the lower case assembly 30 in a removable manner whereby the module assembly 10 and the PCB board assembly 31 are horizontally clamped between the module clamping device 330 and the lower case assembly 30.

The rear port attachment means of the lower case assembly 30 is a vertical panel 38 with a U-shaped opening 34 on its upper edge. The vertical panel 38 of the lower case assembly 30 further comprises a case assembly attachment means 35 on the top ends of the left and right sides of the U-shaped opening 34 and the upper case assembly 341 further comprises a correspondent case assembly attachment means 342 wherein the case assembly attachment means 342 of the upper case assembly 341 engages and securely attaches to the case assembly attachment means 35 of the vertical panel 38 of the lower case assembly 30 whereby the rear port 14 of the module assembly 10 is locked and secured between the upper case assembly 341 and the U-shaped opening 34 of the lower case assembly 30.

Figures 36A, 36B:
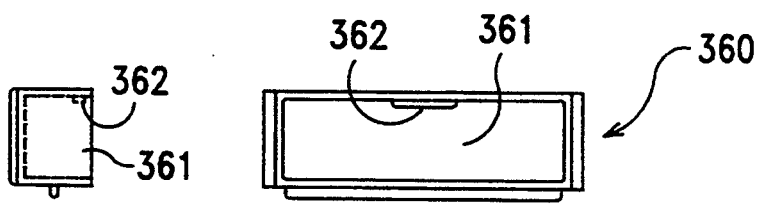
FIG. 36A is the front view of a tail cap according to the present invention.
FIG. 36B is the side view of a tail cap according to the present invention.
Figure 36C:
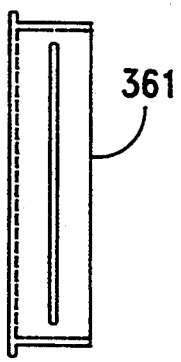
FIG. 36C is the bottom view of a tail cap according to the present invention.
Figure 37A:
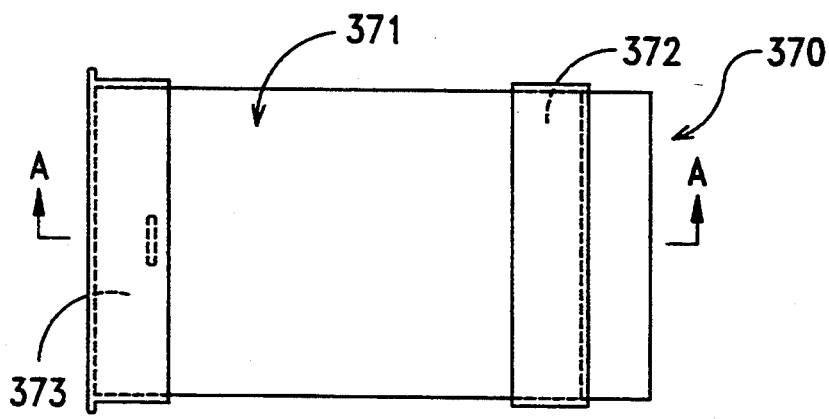
FIG. 37A is the top view of a PCB module according to the presentation.
Figure 37B:
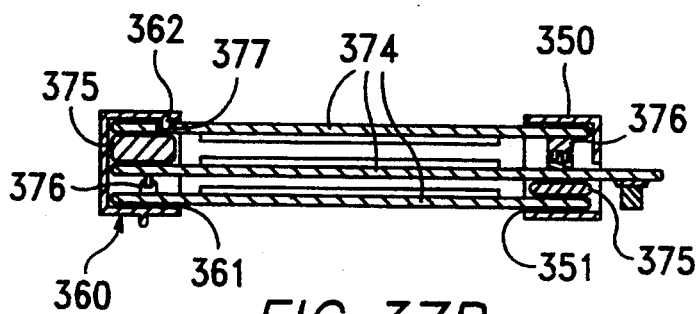
FIG. 37B is the side section view A—A of FIG. 37A.
Figure 37C:
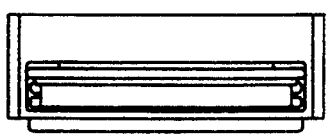
FIG. 37C is the front view of FIG. 37A.

Low profile module assemblies presented in this invention provide the module vendors various I/O port options such as the rear port, lower port, upper port, etc. Traditional add-on cards used in desktop computers can thus be easily transformed into such new low profile module design using these new ports. The following will present a PCB module construction which uses no screw and can be very easily assembled or disassembled by hand. FIG. 35A to FIG. 35D are a shoulder cap 350 and FIG. 36A to FIG. 36C are a tail cap 360 designed for the clamping of the PCB stack 371 which will be shown on FIG. 37B. FIG. 37A to FIG. 37C show the final PCB module assembly 370.

Please refer to FIG. 35A to FIG. 37C. FIGS. 35A, 35B, 35C, and 35D are the top, front, side and rear views of the shoulder cap 350. The shoulder cap 350 is a substantially rectangular assembly having a substantially rectangular concave side 351 on its rear end for clamping the front end 372 of the PCB stack 371 in FIG. 37A.

FIGS. 36A, 36B, and 36C are the front, side and bottom views of the tail cap 360. The tail cap 360 is a substantially rectangular assembly having a substantially rectangular concave side 361 on its front end for clamping the rear end 373 of the PCB stack 371. The tail cap 360 further comprises a protruding edge 362 as the latch receiving means for the PCB stack 371.

FIG. 37A, 37B, and 37C are the top view, the side section view A—A, and the front view of the PCB module 370. It shows that the PCB module assembly 370 comprises a substantially rectangular PCB stack 371 having at least two substantially rectangular PCB assemblies 374 stacking together. The PCB stack 371 has three PCB assemblies 374. It further comprises two rubber pads 375 and two PCB-to-PCB connectors 376 between the three PCB assemblies 374. The front end 372 of the PCB stack 371 is clamped inside the concave side 351 of the should cap 350 and the rear end 373 of the PCB stack 371 is further clamped inside the concave side 361 of the tail cap 360 whereby the PCB module assembly 370 can be easily assembly or disassembled by hand. The PCB stack 371 further comprises a narrow groove 377 on its rear end as the latching means for the tail cap 360 wherein the latching means 377 of the PCB stack 371 engages and securely latches to the latch receiving means 362 of the tail cap 360 in a removably manner whereby the tail cap 360 can be more reliably attached to the rear end of the PCB stack 371.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A modularized electronic system for packaging and assembling a plurality of electronic modules comprising:

at least one external enclosure case having at least two case assemblies each having at least one case assembly attachment means for case assembly mounting wherein said case assembly attachment means of one of said case assemblies engages and securely attaches to said case assembly attachment means of another of said case assemblies; one of said case assemblies comprising a top panel of said external enclosure case is called an upper case assembly and another of said case assemblies comprising a bottom panel of said external enclosure case is called a lower case assembly; said upper case assembly is removably and securely attached to said lower case assembly by said case assembly attachment means of both upper and lower case assemblies when said external enclosure case is closed;

at least one PCB (printed circuit board) board assembly having at least one receptacle installed on it; said PCB board assembly further comprises a PCB board attachment means and said lower case assembly further comprises a PCB board attachment receiving means wherein said PCB board attachment means of the PCB board assembly engages and securely attaches to said PCB board attachment receiving means of the lower case assembly;

at least one electronic module assembly vertically mounted to said lower case assembly; said module assembly comprises:

(1) a substantially rectangular module head in its front end having a rigid module head connector installed under it facing downward direction; said module head connector is vertically connected to said receptacle of the PCB board assembly;

(2) a substantially rectangular module body which is rigidly and horizontally connected to said module head;

(3) at least one substantially rectangular rear, port rigidly and horizontally connected to the rear end of said module body;

at least one vertical panel on said lower case assembly with a U-shaped opening on its upper edge; said rear port of the module assembly is vertically attached to said U-shaped opening of the vertical panel whereby said module assembly is vertically removable from said U-shaped opening of the lower case assembly by hand; said vertical panel of the lower case assembly further comprises a case assembly attachment means on the top ends of the left and right sides of said U-shaped opening and said upper case assembly further comprises a correspondent case assembly attachment means wherein said case assembly attachment means of the upper case assembly engages and securely attaches to said case assembly attachment means of the vertical panel of the lower case assembly whereby said rear port of the module assembly is locked and secured between said upper case assembly and said U-shaped opening of the lower case assembly;

at least one module clamping means installed under said top panel of the upper case assembly; said module clamping means of the upper case assembly engages and removably attaches to the upper end of said module assembly when said external enclosure case is closed whereby said module assembly and said PCB board assembly are horizontally clamped between said upper and lower case assemblies.

2. A modularized electronic system of claim 1 wherein:

said upper case assembly further comprises a metallic cushion means on top of said U-shaped opening of the lower case assembly wherein said metallic cushion means of the upper case assembly is in contact with the upper end of said rear port of the module assembly when said external enclosure case is closed to provide the RFI/EMI (electromagnetic interference and radio frequency interference) protection to said modularized electronic system.

3. A modularized electronic system of claim 1 wherein:

said module assembly further comprises two vertical protruding edges on the left and right sides of said rear port wherein both inner si des of said two vertical protruding edges inwardly attach to the two correspondent edges of said U-shaped opening of the lower case assembly whereby said module assembly sustains more external pushing force from its rear end.

4. A modularized electronic system of claim 1 wherein:
said module assembly further comprises a vertical protruding edge on the bottom end of said rear port wherein the outer side of said vertical protruding edge of the rear port outwardly and removably attaches to the bottom edge of said U-shaped opening of tile lower case assembly whereby said module assembly sustains more external pulling force from its rear end when said external enclosure case is closed.

5. A modularized electronic system of claim 1 wherein:
said module head connector is disposed higher than the bottom of said module body whereby said module head connector do not touch the bottom surface when placed externally and thus makes it easier to keep said module head connector clean and to avoid damage.

6. A modularized electronic system of claim 1 wherein:
said module assembly further comprises a vertical peripheral receptacle on one side facing upward direction; said modularized electronic system further comprises a peripheral module having a substantially rectangular peripheral body with a vertical peripheral connector on the correspondent side facing downward direction wherein said peripheral connector of the peripheral module is vertically and removably connected to said peripheral receptacle of the module assembly; said peripheral module further comprises a substantially rectangular rear port rigidly and horizontally connected to the rear end of said peripheral body and said lower case assembly further comprises a correspondent rear port attachment means behind said rear port wherein said rear port of the peripheral module is vertically and removably attached to said rear port attachment means of the lower case assembly; said lower case assembly further comprises a cushion means under said peripheral body to support the front end of said peripheral module whereby said peripheral module is reliably mounted to the lower case assembly horizontally; said upper case assembly further comprises another module clamping means above said peripheral body wherein said another module clamping means of the upper case assembly is in contact with the upper end of said peripheral body whereby said peripheral module is reliably clamped between said upper and lower case assemblies when said external enclosure case is closed.

7. A modularized electronic system of claim 1 wherein:
said module assembly, further comprises a substantially rectangular lower protruding port on the bottom end of said module body and said lower case assembly further comprises a correspondent bottom opening under said lower protruding port wherein said lower protruding port of the module assembly extends through said bottom opening of the, lower case assembly when said external enclosure case is closed whereby said lower protruding port is accessible externally from the bottom side.

8. A modularized electronic system of claim 7 wherein: said lower case assembly further comprises a metallic cushion means installed around said bottom opening wherein said metallic cushion means of the lower case assembly is in contact with the surrounding part of said lower protruding port of the module assembly to provide RFI/EMI protection to said modularized electronic system.

9. A modularized electronic system of claim 1 wherein:
said module assembly further comprises a substantially rectangular upper protruding port on the upper end of said module body and said upper case assembly further comprises a correspondent top opening on top of said upper protruding port wherein said upper protruding port of the module assembly extends through said top opening of the upper case assembly when said external enclosure case is closed whereby said upper protruding port is accessible externally from the top.

10. A modularized electronic system of claim 9 wherein:
said upper case assembly further comprises a metallic cushion means installed around said top opening wherein said metallic cushion means of the upper case assembly is in contact with the surrounding part of said upper protruding port of the module assembly to provide RFI/EMI protection to said modularized electronic system.

11. A modularized electronic system of claim 9 wherein:
said modularized electronic system further comprises a substantially rectangular external module assembly on top of said upper protruding port; said external module assembly comprises at least one module connector rigidly installed on its bottom and said upper protruding port further comprises a correspondent receptacle wherein said module connector of the external module assembly is vertically and removably connected to said receptacle of the upper protruding port; said external module assembly further comprises an external module attachment means and said upper case assembly of the external enclosure case further comprises a correspondent external module attachment receiving means wherein said external module attachment means of the external module assembly engages and securely attaches to said external module attachment receiving means of the upper case assembly whereby said external module assembly is removable and replaceable externally by hand.

12. A modularized electronic system of claim 11 wherein:
said external module attachment means of said external module assembly is a removable hinge device on one end and a latching means on the opposite end and said external module attachment receiving means of the upper case assembly is a hinge receiving device on one side and a latch receiving means on the other side of said upper protruding port wherein said removable hinge device of the external module assembly engages and removably attaches to said hinge receiving device of the upper case assembly on one end and said latching means of the external module assembly engages and removably latches to said latch receiving means of tile upper case assembly on the other end whereby said external module assembly is removable from said upper case assembly by hand.

13. A modularized electronic system of claim 1 wherein:
said modularized electronic system further comprises a substantially rectangular external module assembly attached to the top of said upper case assembly; said external module assembly comprises at least one module connector rigidly installed on its bottom; said upper case assembly further comprises a correspondent opening under said module connector of the external module assembly and said PCB board assembly attached to said lower case assembly further comprises a correspondent receptacle wherein said module connector of the external module assembly is vertically and removably connected to said receptacle of the PCB board assembly through said opening of the upper case assembly; said external module assembly further comprises an external module attachment means and said upper case assembly further comprises a correspondent external module attachment receiving means wherein said external module attachment means of the external module assembly engages and securely attaches to said external module attachment receiving means of the upper case assembly whereby said external module assembly is removable and replaceable externally by hand.

14. A modularized electronic system of claim 13 wherein:
said external module attachment means of said external module assembly is a removable hinge device on one end and a latching means on the opposite end and said external module attachment receiving means of the upper case assembly is a hinge receiving device on one side and a latch receiving means on the opposite side wherein said removable hinge device of the external module assembly engages and removably attaches to said hinge receiving device of the upper case assembly on one end and said latching means of the external module assembly engages and removably latches to said latch receiving means of the upper case assembly on the other end whereby said external module assembly is removable from said upper case assembly by hand.

15. A modularized electronic system of claim 1 wherein: said lower case assembly further comprises two vertical rib-like devices on the left-and right sides of said U-shaped opening wherein each of said vertical rib-like devices is rigidly installed between the vertical and bottom panels of the lower case assembly to strengthen the structure of said vertical panel which is substantially weakened by said U-shaped opening whereby the structure of the lower case assembly is greatly strengthened by said two vertical rib-like devices.

16. A modularized electronic system of claim 1 wherein: said lower case assembly further comprises a case frame which is made of rigid material and has a vertical side panel and an inward L-shaped bottom panel on its lower end wherein said case frame is permanently bound to the inner sides of said vertical panel and said bottom panel of the lower case assembly to strengthen its case structure.

17. A modularized electronic system of claim 16 wherein:
said case frame further comprises an inward L-shaped top end on top of said vertical side panel of the case frame as the case assembly attachment means of the lower case assembly and the upper case assembly further comprises a lower protruding edge as the correspondent case assembly attachment means wherein the inner side of said lower protruding edge of the upper case assembly engages and securely attaches to the outer side of said inward L-shaped top end of the lower case assembly when said external enclosure case is closed whereby the contacting areas between said upper and lower case assemblies are greatly expanded by said inward L-shaped top end and thus dramatically reduces the possibility of structural damages to said contacting areas by external shocking forces.

18. A modularized electronic system of claim 16 wherein: said case frame further comprises a vertical edge along the inner end of its inward L-shaped bottom panel to strengthen the case frame structure which is substantially weakened by said U-shaped opening of the lower case assembly.

19. A modularized electronic system of claim 1 wherein: said upper case assembly further comprises at least one rib-like device under said top panel of the upper case assembly to strengthen the case structure of said upper case assembly for multiple module clamping.

20. A modularized electronic system of claim 1 wherein:
said upper and lower case assemblies are further connected together by a hinge device wherein said hinge device is installed between the lower end of one of the side panels of said upper case assembly and the top end of a correspondent side panel of said lower case assembly whereby said upper and lower case assemblies are reliably connected together by said hinge device.

21. A modularized electronic system of claim 1 wherein:
said case assembly attachment means of the upper case assembly is a latching means installed on the lower end of one of its side panel s and the correspondent case assembly attachment means of said lower case assembly is a latch receiving means on the top end of a correspondent side panel of said lower case assembly wherein said latching means of the upper case assembly engages and securely latches to said latch receiving means of the lower case assembly.

22. A modularized electronic system of claim 1 wherein:
said external enclosure case further comprises at least one corner-like device having a corner-shaped concave side on its back; said corner-like device is made of rigid material and has a cushion means covering on the surface of said concave side; said corner-like device is permanently attached to a case corner of said external enclosure case externally with said cushion means bound in between whereby said case corner of the external enclosure case sustains much bigger external shocking force by distributing the external shocking force over said cushion means to avoid possible structural damage.

23. A modularized electronic system of claim 1 wherein:
said PCB board attachment means is a latching means installed on one end of said PCB board assembly and said PCB board attachment receiving means of the lower case assembly is a correspondent latch receiving means wherein said latching means of the PCB board assembly engages and removably latches to said latch receiving means of the lower case assembly whereby said PCB board assembly is removable from said lower case assembly by hand.

24. A modularized electronic system of claim 1 wherein:

said PCB board attachment means is a substantially rectangular side port installed on one end and said PCB board attachment receiving means of the lower case assembly is a correspondent U-shaped opening on top of a vertical panel wherein said side port of the PCB board assembly engages and vertically attaches to said U-shaped opening of the lower case assembly whereby said PCB board assembly is removable from said lower case assembly by hand.

25. A modularized electronic system of claim 1 wherein: said lower case assembly further comprises at least one PCB board cushion means disposed under said PCB board assembly wherein said PCB board cushion means of the lower case assembly is clamped under said PCB board assembly when said module assembly is clamped between said upper and lower case assemblies whereby said PCB board assembly and said module assembly are more reliably clamped between said upper and lower case assemblies.

26. A modularized electronic system of claim 1 wherein:

said module assembly comprises:
(1) one substantially rectangular PCB stack having at least two substantially rectangular PCB assemblies stacking together;
(2) one substantially rectangular shoulder cap having a substantially rectangular concave side on its rear end for clamping tile front end of said PCB stack;
(3) one substantially rectangular tail cap having a substantially rectangular concave side on its front end for clamping the rear end of said PCB stack;

wherein the front end of said PCB stack is clamped inside said concave side of the shoulder cap and the rear end of said PCB stack is further clamped inside said concave side of the tail cap.

27. A modularized electronic system of claim 26 wherein:

said PCB stack further comprises a latching means on its rear end and said tail cap further comprises a correspondent latch receiving means wherein said latching means of the PCB stack engages and securely latches to said latch receiving means of the tail cap whereby said tail cap is reliably attached to the rear end of said PCB stack.

28. A modularized electronic system for packaging and assembling a plurality of electronic modules comprising:

(1) at least one external enclosure case having at least two case assemblies each having at least one case assembly attachment means wherein said case assembly attachment means of one of said case assemblies engages and securely attaches to said case assembly attachment means of another of said case assemblies; one of said case assemblies comprising a top panel of said external enclosure case is called an upper case assembly and another of said case assemblies comprising a bottom panel of said external enclosure case is called a lower case assembly; said upper case assembly is removably and securely attached to said lower case assembly by said case assembly attachment means of both upper and lower case assemblies when said external enclosure case is closed;

(2) at least one PCB board assembly having at least one receptacle installed on it; said PCB board assembly further comprises a PCB board attachment means and said lower case assembly further comprises a PCB board attachment receiving means wherein said PCB board attachment means of the PCB board assembly engages and securely attaches to said PCB board attachment receiving means of the lower case assembly;

(3) at least one electronic module assembly vertically mounted to said lower case assembly; said module assembly comprises:
(a) a substantially rectangular module head in its front end having a rigid module head connector installed under it facing downward direction; said module head connector is vertically connected to said receptacle of the PCB board assembly;
(b) a substantially rectangular module body which is rigidly and horizontally connected to said module head;
(c) at least one substantially rectangular-rear port rigidly and horizontally connected to the rear end of said module body;

(4) at least one rear port attachment means on said lower case assembly wherein said rear port of the module assembly is vertically attached to said rear port attachment means of the lower case assembly whereby said module assembly is vertically removable from said lower case assembly by hand;

(5) at least one mounting kit disposed on top of said module assembly wherein said mounting kit is clamped between said upper case assembly and said module assembly when said external enclosure case is closed whereby said module assembly and said PCB board assembly are horizontally clamped between said upper and lower case assemblies by the assistance of said mounting kit, 29. A modularized electronic system of claim 28 wherein: said rear port attachment means of the lower case assembly is a vertical panel with a U-shaped opening on its upper edge; said vertical panel of the lower case assembly further comprises a case assembly attachment means on the top ends of the left and right sides of said U-shaped opening and said upper case assembly further comprises a correspondent case assembly attachment means wherein said case assembly attachment means of the upper case assembly engages and securely attaches to said case assembly attachment means of the vertical panel of the lower case assembly whereby said rear port of the module assembly is locked and secured between said upper case assembly and said U-shaped opening of the lower case assembly.

30. A modularized electronic system for packaging and assembling a plurality of electronic modules comprising:

(1) at least one external enclosure case having at least two case assemblies each having at least one case assembly attachment means wherein said case assembly attachment means of one of said case assemblies engages and securely attaches to said case assembly attachment means of another of said case assemblies; one of said case assemblies comprising a top panel of said external enclosure case is called an upper case assembly and another of said case assemblies comprising a bottom panel of said external enclosure case is called a lower case assembly; said upper case assembly is removably and securely attached to said lower case assembly by said case assembly attachment means of both upper and lower case assemblies when said external enclosure case is closed;

(2) at least one PCB board assembly having at least one receptacle installed on it; said PCB board assembly further comprises a PCB board attachment means and said lower case assembly further comprises a PCB board attachment receiving means wherein said PCB board attachment means of the PCB board assembly engages and securely attaches to said PCB board attachment receiving means of the lower case assembly;

(3) at least one electronic module assembly vertically mounted to said lower case assembly; said module assembly comprises:
  (a) a substantially rectangular module head in its front end having a rigid module head connector installed under it facing downward direction; said module head connector is vertically connected to said receptacle of the PCB board assembly;
  (b) a substantially rectangular module body which is rigidly and horizontally connected to said module head;
  (c) at least one substantially rectangular rear port rigidly and horizontally connected to the rear end of said module body;

(4) at least one rear port attachment means on said lower case assembly wherein said rear port of the module assembly is vertically attached to said rear port attachment means of the lower case assembly whereby said module assembly is vertically removable from said lower case assembly by hand;

(5) at least one module clamping device having a device attachment means and said lower case assembly further comprises a correspondent device receiving means for the attachment of said module clamping device; said module clamping device further comprises at least one module clamping means on its lower end wherein said module clamping means of the module clamping device engages and removably attaches to the upper end of said module assembly when said device attachment means of the module clamping device engages and securely attaches to said device receiving means of the lower case assembly whereby said module assembly and said PCB board assembly are horizontally clamped between said module clamping device and said lower case assembly.

31. A modularized electronic system of claim 30 wherein: said rear port attachment means of the lower case assembly is a vertical panel with a U-shaped opening on its upper edge; said vertical panel of the lower case assembly further comprises a case assembly attachment means on the top ends of the left and right sides of said U-shaped opening and said upper case assembly further comprises a correspondent case assembly attachment means wherein said case assembly attachment means of the upper case assembly engages and securely attaches to said case assembly attachment means of the vertical panel of the lower case assembly whereby said rear port of the module assembly is locked and secured between said upper case assembly and said U-shaped opening of the lower case assembly.

* * * * *